US007873695B2

(12) United States Patent
Clegg et al.

(10) Patent No.: US 7,873,695 B2
(45) Date of Patent: Jan. 18, 2011

(54) MANAGING CONNECTIONS AND MESSAGES AT A SERVER BY ASSOCIATING DIFFERENT ACTIONS FOR BOTH DIFFERENT SENDERS AND DIFFERENT RECIPIENTS

(75) Inventors: Paul J. Clegg, Pacifica, CA (US); Eric C. Huss, San Francisco, CA (US); Craig Sprosts, San Francisco, CA (US); Shun Chen, Union City, CA (US); Robert Brahms, San Ramon, CA (US); Daniel Quinlan, San Bruno, CA (US)

(73) Assignee: Ironport Systems, Inc., San Bruno, CA (US)

( * ) Notice: Subject to any disclaimer, the term of this patent is extended or adjusted under 35 U.S.C. 154(b) by 1132 days.

(21) Appl. No.: 11/140,314

(22) Filed: May 27, 2005

(65) Prior Publication Data
US 2006/0010215 A1    Jan. 12, 2006

Related U.S. Application Data

(60) Provisional application No. 60/575,658, filed on May 29, 2004.

(51) Int. Cl.
G06F 15/16        (2006.01)
(52) U.S. Cl. .................................. 709/206; 709/207
(58) Field of Classification Search .................. 709/206
See application file for complete search history.

(56) References Cited

U.S. PATENT DOCUMENTS 5,319,776 A    6/1994    Hile et al.

5,623,600 A    4/1997    Ji et al.

(Continued)

FOREIGN PATENT DOCUMENTS

WO    WO 01/67330    9/2001

(Continued)

OTHER PUBLICATIONS

Wong, J. 1998. Preventing Spams and Relays. Linux J. 1998, 56es (Dec. 1998), 10.*

(Continued)

Primary Examiner—Saleh Najjar
Assistant Examiner—Robert Shaw
(74) Attorney, Agent, or Firm—Hickman Palermo Truong & Becker LLP

(57) ABSTRACT

A method and apparatus for managing connections and messages at a server by associating different actions for both different senders and different recipients is disclosed. The server manages connections from different senders by receiving incoming connections from the different senders and determining sender identifiers for the incoming connections. The server inspects a mapping of sender identifiers to actions to identify which action should be applied to each incoming connection. The server applies the actions, such as accepting the connection, rejecting the connection, relaying the connection, or refusing the connection. Also, the server manages electronic messages for different recipients by determining recipient identifiers for the electronic messages. The server inspects a mapping of recipient identifiers to actions to identify which action should be applied for the recipients of the email messages. The server applies the actions, such as accepting or rejecting the email message for delivery to a recipient.

15 Claims, 6 Drawing Sheets

U.S. PATENT DOCUMENTS

| | | | |
|---|---|---|---|
| 5,802,178 A | 9/1998 | Holden et al. | |
| 5,805,810 A | 9/1998 | Maxwell | |
| 5,828,881 A | 10/1998 | Wang | |
| 5,832,208 A | 11/1998 | Chen et al. | |
| 5,889,943 A | 3/1999 | Ji et al. | |
| 5,915,087 A | 6/1999 | Hammond et al. | |
| 5,933,416 A | 8/1999 | Schenkel et al. | |
| 5,958,005 A | 9/1999 | Thorne et al. | |
| 5,966,685 A * | 10/1999 | Flanagan et al. | 704/8 |
| 5,968,176 A | 10/1999 | Nessett et al. | |
| 5,983,270 A | 11/1999 | Abraham et al. | |
| 5,983,350 A | 11/1999 | Minear et al. | |
| 5,999,967 A | 12/1999 | Sundsted | |
| 6,003,084 A | 12/1999 | Green et al. | |
| 6,052,709 A * | 4/2000 | Paul | 709/202 |
| 6,072,942 A * | 6/2000 | Stockwell et al. | 709/206 |
| 6,073,142 A * | 6/2000 | Geiger et al. | 715/205 |
| 6,073,165 A * | 6/2000 | Narasimhan et al. | 709/206 |
| 6,131,110 A | 10/2000 | Bates et al. | |
| 6,161,130 A | 12/2000 | Horvitz et al. | |
| 6,192,114 B1 | 2/2001 | Council | |
| 6,195,587 B1 | 2/2001 | Hruska et al. | |
| 6,212,558 B1 | 4/2001 | Antur et al. | |
| 6,226,670 B1 | 5/2001 | Ueno et al. | |
| 6,233,618 B1 | 5/2001 | Shannon | |
| 6,266,664 B1 | 7/2001 | Russell-Falla et al. | |
| 6,266,692 B1 | 7/2001 | Greenstein | |
| 6,289,105 B1 | 9/2001 | Murota | |
| 6,321,264 B1 | 11/2001 | Fletcher et al. | |
| 6,330,590 B1 | 12/2001 | Cotten | |
| 6,341,309 B1 | 1/2002 | Vaid et al. | |
| 6,393,568 B1 | 5/2002 | Ranger et al. | |
| 6,408,336 B1 | 6/2002 | Schneider et al. | |
| 6,415,313 B1 * | 7/2002 | Yamada et al. | 709/200 |
| 6,421,709 B1 | 7/2002 | McCormick et al. | |
| 6,434,600 B2 | 8/2002 | Waite et al. | |
| 6,453,327 B1 | 9/2002 | Nielsen | |
| 6,460,010 B1 | 10/2002 | Hanes et al. | |
| 6,460,050 B1 | 10/2002 | Pace et al. | |
| 6,484,203 B1 | 11/2002 | Porras et al. | |
| 6,484,261 B1 | 11/2002 | Wiegel | |
| 6,499,081 B1 | 12/2002 | Nataraj et al. | |
| 6,502,131 B1 | 12/2002 | Vaid et al. | |
| 6,507,866 B1 * | 1/2003 | Barchi | 709/207 |
| 6,539,430 B1 | 3/2003 | Humes | |
| 6,546,416 B1 | 4/2003 | Kirsch | |
| 6,587,550 B2 | 7/2003 | Council et al. | |
| 6,591,291 B1 | 7/2003 | Gabber et al. | |
| 6,609,196 B1 | 8/2003 | Dickinson, III et al. | |
| 6,650,890 B1 | 11/2003 | Irllam et al. | |
| 6,654,787 B1 * | 11/2003 | Aronson et al. | 709/206 |
| 6,675,162 B1 | 1/2004 | Russell-Falla et al. | |
| 6,687,732 B1 | 2/2004 | Bector et al. | |
| 6,708,205 B2 | 3/2004 | Sheldon et al. | |
| 6,732,157 B1 | 5/2004 | Gordon et al. | |
| 6,748,422 B2 | 6/2004 | Morin et al. | |
| 6,785,712 B1 | 8/2004 | Hogan et al. | |
| 6,785,732 B1 | 8/2004 | Bates et al. | |
| 6,802,012 B1 | 10/2004 | Smithson et al. | |
| 6,886,099 B1 | 4/2005 | Smithson et al. | |
| 6,894,981 B1 | 5/2005 | Coile et al. | |
| 6,941,348 B2 * | 9/2005 | Petry et al. | 709/206 |
| 7,023,852 B1 | 4/2006 | Mar et al. | |
| 7,024,431 B1 | 4/2006 | Kornelson et al. | |
| 7,054,907 B1 | 5/2006 | Sherwood | |
| 7,072,942 B1 * | 7/2006 | Maller | 709/206 |
| 7,093,018 B1 | 8/2006 | Sievers et al. | |
| 7,149,778 B1 | 12/2006 | Patel et al. | |
| 7,171,450 B2 | 1/2007 | Wallace et al. | |
| 7,181,498 B2 | 2/2007 | Zhu et al. | |
| 7,184,971 B1 * | 2/2007 | Ferber | 705/14 |
| 7,206,814 B2 | 4/2007 | Kirsch | |
| 7,272,853 B2 | 9/2007 | Goodman et al. | |
| 7,366,761 B2 | 4/2008 | Murray et al. | |
| 7,406,503 B1 | 7/2008 | Little et al. | |
| 7,409,708 B2 | 8/2008 | Goodman et al. | |
| 7,475,118 B2 | 1/2009 | Leiba et al. | |
| 7,490,128 B1 * | 2/2009 | White et al. | 709/206 |
| 7,523,168 B2 | 4/2009 | Chadwick et al. | |
| 7,543,052 B1 | 6/2009 | Klein | |
| 7,577,736 B1 | 8/2009 | Ovenden | |
| 7,627,670 B2 | 12/2009 | Haverkos | |
| 7,647,411 B1 | 1/2010 | Schiavone et al. | |
| 7,716,351 B1 | 5/2010 | White et al. | |
| 2001/0005885 A1 | 6/2001 | Elgamal et al. | |
| 2001/0039593 A1 * | 11/2001 | Hariu | 709/249 |
| 2002/0004908 A1 | 1/2002 | Galea | |
| 2002/0016824 A1 | 2/2002 | Leeds | |
| 2002/0023135 A1 | 2/2002 | Shuster | |
| 2002/0026487 A1 | 2/2002 | Ogilvie et al. | |
| 2002/0040394 A1 | 4/2002 | Shapira | |
| 2002/0059385 A1 | 5/2002 | Lin | |
| 2002/0059418 A1 | 5/2002 | Bird et al. | |
| 2002/0116463 A1 | 8/2002 | Hart | |
| 2002/0120600 A1 * | 8/2002 | Schiavone et al. | 707/1 |
| 2002/0133469 A1 | 9/2002 | Patton | |
| 2002/0165902 A1 | 11/2002 | Robb et al. | |
| 2002/0169954 A1 | 11/2002 | Bandini et al. | |
| 2002/0184315 A1 | 12/2002 | Earnest | |
| 2002/0184533 A1 * | 12/2002 | Fox | 713/201 |
| 2002/0198950 A1 | 12/2002 | Leeds | |
| 2002/0199095 A1 | 12/2002 | Bandini et al. | |
| 2003/0004908 A1 | 1/2003 | Linthicum et al. | |
| 2003/0014490 A1 | 1/2003 | Bates et al. | |
| 2003/0050988 A1 * | 3/2003 | Kucherawy | 709/207 |
| 2003/0055908 A1 | 3/2003 | Brown et al. | |
| 2003/0069933 A1 | 4/2003 | Lim et al. | |
| 2003/0069935 A1 | 4/2003 | Hasegawa | |
| 2003/0079142 A1 | 4/2003 | Margalit et al. | |
| 2003/0093689 A1 | 5/2003 | Elzam et al. | |
| 2003/0097591 A1 | 5/2003 | Pham et al. | |
| 2003/0110224 A1 | 6/2003 | Cazier et al. | |
| 2003/0131063 A1 | 7/2003 | Breck | |
| 2003/0149726 A1 * | 8/2003 | Spear | 709/206 |
| 2003/0158905 A1 * | 8/2003 | Petry et al. | 709/206 |
| 2003/0167402 A1 | 9/2003 | Stolfo et al. | |
| 2003/0172050 A1 | 9/2003 | Decime et al. | |
| 2003/0172291 A1 | 9/2003 | Judge et al. | |
| 2003/0191969 A1 * | 10/2003 | Katsikas | 713/201 |
| 2003/0212791 A1 | 11/2003 | Pickup | |
| 2003/0225850 A1 * | 12/2003 | Teague | 709/207 |
| 2003/0233418 A1 * | 12/2003 | Goldman | 709/206 |
| 2004/0003255 A1 * | 1/2004 | Apvrille et al. | 713/178 |
| 2004/0019651 A1 | 1/2004 | Andaker | |
| 2004/0024632 A1 * | 2/2004 | Perry | 705/10 |
| 2004/0054742 A1 | 3/2004 | Gruper et al. | |
| 2004/0058673 A1 | 3/2004 | Irlam et al. | |
| 2004/0064371 A1 | 4/2004 | Crapo | |
| 2004/0068542 A1 | 4/2004 | Lalonde et al. | |
| 2004/0073617 A1 | 4/2004 | Milliken et al. | |
| 2004/0083230 A1 | 4/2004 | Caughey | |
| 2004/0093384 A1 | 5/2004 | Shipp | |
| 2004/0111381 A1 * | 6/2004 | Messer et al. | 705/78 |
| 2004/0117648 A1 | 6/2004 | Kissel | |
| 2004/0139165 A1 | 7/2004 | McMillan et al. | |
| 2004/0148493 A1 | 7/2004 | Chu et al. | |
| 2004/0167964 A1 | 8/2004 | Rounthwaite et al. | |
| 2004/0167968 A1 | 8/2004 | Wilson et al. | |
| 2004/0177120 A1 * | 9/2004 | Kirsch | 709/206 |
| 2004/0181581 A1 | 9/2004 | Kosco | |
| 2004/0186891 A1 * | 9/2004 | Panec et al. | 709/206 |
| 2004/0199592 A1 | 10/2004 | Gould et al. | |
| 2004/0199627 A1 | 10/2004 | Frietsch | |
| 2004/0210422 A1 | 10/2004 | Takahashi et al. | |

| | | | |
|---|---|---|---|
| 2004/0215977 A1 | 10/2004 | Goodman et al. | |
| 2004/0221016 A1 | 11/2004 | Hatch et al. | |
| 2004/0250127 A1* | 12/2004 | Scoredos et al. | 713/201 |
| 2004/0254990 A1 | 12/2004 | Mittal | |
| 2004/0260922 A1 | 12/2004 | Goodman et al. | |
| 2005/0005107 A1 | 1/2005 | Touboul | |
| 2005/0015456 A1 | 1/2005 | Martinson | |
| 2005/0064850 A1 | 3/2005 | Irlam et al. | |
| 2005/0071485 A1 | 3/2005 | Ramagopal | |
| 2005/0080855 A1 | 4/2005 | Murray | |
| 2005/0080856 A1 | 4/2005 | Kirsch | |
| 2005/0080857 A1* | 4/2005 | Kirsch et al. | 709/206 |
| 2005/0091319 A1* | 4/2005 | Kirsch | 709/206 |
| 2005/0108518 A1 | 5/2005 | Pandya | |
| 2005/0182959 A1 | 8/2005 | Petry et al. | |
| 2005/0193429 A1 | 9/2005 | Demopoulos et al. | |
| 2005/0198518 A1* | 9/2005 | Kogan et al. | 713/188 |
| 2005/0203994 A1* | 9/2005 | Palmer et al. | 709/203 |
| 2005/0204005 A1 | 9/2005 | Purcell et al. | |
| 2005/0240617 A1 | 10/2005 | Lund et al. | |
| 2005/0246440 A1 | 11/2005 | Yu | |
| 2005/0265319 A1 | 12/2005 | Clegg et al. | |
| 2005/0283837 A1 | 12/2005 | Olivier et al. | |
| 2006/0031306 A1 | 2/2006 | Haverkos | |
| 2006/0168006 A1 | 7/2006 | Shannon et al. | |
| 2008/0104186 A1 | 5/2008 | Wieneke et al. | |
| 2008/0104187 A1 | 5/2008 | Wilson et al. | |
| 2008/0256072 A1 | 10/2008 | Logan et al. | |
| 2008/0270540 A1 | 10/2008 | Larsen | |
| 2009/0019126 A1 | 1/2009 | Adkins | |

FOREIGN PATENT DOCUMENTS

| | | |
|---|---|---|
| WO | WO 01/67330 A1 | 9/2001 |
| WO | WO/ 02/19069 A2 | 3/2002 |
| WO | WO 02/25464 | 3/2002 |
| WO | WO 02/25464 A1 | 3/2002 |
| WO | WO 02/39356 | 5/2002 |
| WO | WO 02/39356 A1 | 5/2002 |
| WO | WO 02/19069 | 7/2002 |
| WO | WO 02/19069 A | 7/2002 |

OTHER PUBLICATIONS

SpamAssassin:http://web.archive.org/web/20040202050055/au.spamassassin.org/index.html.*

Ironport Messaging Gateway Appliances: http://web.archive.org/web/20030421095627/http://ironport.com/ http://web.archive.org/web/20030405102438/www.senderbase.com/ http://web.archive.org/web/20030724022036/www.ironport.com/pdf/ironport_c60_brochure.pdf.*

Microsoft Computer Dictionary, Fifth Edition (May 2002) ISBN-10: 0-7356-1495-4 ISBN-13: 978-0-7356-1495-6.*

Roderick W. Smith, Advanced Linux Networking, Addison Wesley Professional (Jun. 2002)ISBN-10: 0-201-77423-2ISBN-13: 978-0-201-77423-8.*

R. Hinden, ed., Applicability Statement for the Implementation of Classless Inter-Domain Routing (CIDR) , RFC 1517, Sep. 1993.*

Y. Rekhter & T. Li, eds. , An Architecture for IP Address Allocation with CIDR, RFC 1518, Sep. 1993.*

John Wong, Preventing Spams and Relays, Linux Journal vol. 1998 Issue 56es Article #10 (Dec. 1998) ISSN: 1075-3583.*

The American Heritage® Dictionary of the English Language—definition "aggregate" Feb. 2010 (2 pages).

International Bureau, "International Preliminary Report on Patentability," PCT/US2005/018999, dated Feb. 28, 2007, 5 pages.

Current Claims, PCT/US2005/018999 (60063-0056), 14 pages.

International Searching Authority, "Notification of Transmittal of the International Search Report and the Written Opinion of the International Searching Authority, or the Declaration," PCT/US/19143 (60063-0104), Dated Apr. 7, 2006, 8 pages.

Current Claims, PCT/US05/19143, 24 pages.

Y. Rekhter & T. Li, eds., An Architecture for IP Address Allocation with CIDR, RFC 1518, Sep. 1993.

Harris, E., "GreyListing Whitepaper" (2003) http://projects.puremagic.com/greylisting/whitepaper.html (20 pages).

Ironport Messaging Gateway Appliances: http://web.archive.org/web/20030421095627/http://ironport.com/ http://web.archive.org/web/20030405102438/www.senderbase.com/ http://web.archive.org/web/20030724022036/www.ironport.com/pdf/ironport_c60_brochure.pdf (17 pages).

Microsoft Computer Dictionary, Fifth Edition (May 2002) ISBN-10: 0-7356-1495-4 ISBN-13: 978-0-7356-1495-6 (5 pages).

CAPSA, "Packet Inspector", retrieved from: http://web.archive.org/web20030118183455/http://www.javvin.com/packet.html And http://web.archive.org/web20030416233408/http://javvin.com/packet.html, dated Nov. 8, 2008, 10 pages.

European Patent Office, "Communication pursuant to Article 96 (2) EPC", European application No. 05 723 433.8—1244, received Aug. 22, 2007, 5 pages.

Claims, European application No. 05 723 433.8—1244, 13 pages.

International Searching Authority, "Notification of transmittal of the international search report and the written opinion of the international searching authority, or the declaration," International Application No. PCT/US05/18569, dated Oct. 17, 2005, 10 pages.

Current claims, PCT/US05/18569, 7 pages.

International Searching Authority, "Notification of Transmittal of the International Search Report and the Written Opinion of the International Searching Authority, or the Declaration," PCT/US04/00969, Aug. 18, 2004, 10 pages. (Reference on CD-ROM).

Current Claims in PCT patent application, International Application No. PCT/US03/37417, 16 pages. (Reference on CD-ROM).

Current Claims in International Application, application No. PCT/US04/00969, 19 pages. (Reference on CD-ROM).

International Searching Authority, "Notification of Transmittal of the International Search Report or the Declaration," PCT/US03/37417, Jun. 8, 2004, 7 pages. (Reference on CD-ROM).

Kent, Stephen T., "Internet Privacy Enhanced Email," Communications of the ACM, vol. 36, No. 8, Aug. 1993, pp. 48-60. (Reference on CD-ROM).

Oppliger, Rolf, "Internet Security; Firewalls and Bey," Communication of the ACM, vol. 40, No. 5, May 1997, pp. 92-102. (Reference on CD-ROM).

Weisband, Suzanne P. et al., "Managing User Perceptions of Email Privacy," Communications of the ACM, vol. 38, No. 12, Dec. 1995, pp. 40-47. (Reference on CD-ROM).

International Searching Authority, "Notification of transmittal of the international search report and the written opinion of the international searching authority, or the declaration," international application No. PCT/US2005/005498, dated May 12, 2005, 12 pages. (Reference on CD-ROM).

Current Claims, PCT/US2005/005498, 14 pages. (Reference on CD-ROM).

R. Hiden, ed., Applicability Statement for the Implementation of Classless Inter-Domain Routing (CIDR), RFC 1517, Sep. 1993.

R. Malhotra, IP Routing, O'Reilly Media, Inc., Jan. 24, 2002, ISBN-13: 978-0-593-00275-6, Chapter 7.

Microsoft Computer Dictionary, Fifth Edition (May 2002) ISBN-10: 0-7356-1495-4 ISBN-13: 978-0-7356-1495-6.

Klensin, J., "Simple mail Transfer Protocol," Network Working Group, RFC 2821, dated Apr. 2001, 79 pages.

International Searching Authority, "Notification of Transmittal of the International Search Report and the Written Opinion of the International Searching Authority, or the Declaration," PCT/US05/18999, Feb. 6, 2007, 8 pages.

Current Claims, PCT/US05/18999, 14 pages.

Ironport Messaging Gateway Appliances: http://web.archive.org/web/20030421095627/http://ironport.com/ http://web.archive.org/web/20030405102438/www.senderbase.com/http://web.archive.org/web/20030724022036/www.ironport.com/pdf/ironport c60 brochure.pdf, printed Dec. 2008, 17 pages.

Caspa — Packet Inspector: http://web.archive.org/web/20030118183455/http://www.javvin.com/packet.html http://web.archive.org/web/2003 0416233408/http://javvin.com/packet.html , printed Nov. 2008, 10 pages.

BrightMail Anti-Spam 4.0 Data Sheet (2002).

BrightMail Anti-Virus 4.0 Data Sheet (2002).

NISSC Technical Note Feb. 2004, Spam Mitigation Techniques, Feb. 2004, 17 pages.

Evan Harris, "The Next Step in the Spam Control War: Greylisting", dated Aug. 2003, Hppt://web.archive.org/web/20031008063916/projects.puremagic.com/greylisting/,18 pages.

Avery, Mike, "Networking: Product Reviews: MimeSweeper neatly cleans up e-mail Web Content," Info World Jun. 23, 1997, reproduced by High Beam Research LLC., 3 pages.

Cashramspam.com, "CashRamSpam.com," file://C:\DOCUME~1\Locals~1\temp\20JL2VHQ.htm, printed Feb. 19, 2003, 9 pages.

"Check Point Firewalls," [Online], retrieved from the internet URL: <http://www.trellisnet.com/Security/Checkpoint/firewalls.asp>, Trellis Network Services, Retrieved on May 18, 2004, pp. 1-3.

"Check Point Signs Technology licensing Agreement with RSA Data Security," Check Point Software Technologies LTD., Sep. 18, 1995, 2 pages.

"Check Point Software technologies to Secure Backweb's Internet Broadcasting Software," Check Point Software Technologies LTD., reproduction of article from Internet World dated Dec. 11, 1996, 2 pages.

"Control Data Systems Partners With Check Point Software to Resell FireWall-1," Check Point Software Technologies LTD., Feb. 21, 1996, 2 pages.

MIMEsweeper 2.3 Press Release, "Integralis announces version 2.3 of MIMEsweeper with new email security features," reproduced from Email World, Jun. 13, 1996, 2 pages.

Declude, "List of All Known DNS-based Spam Databases," Apr. 20, 2004, http://www.declude.com/Articles.asp?ID=97, data retrieved Jun. 27, 2005, pp. 1-21.

Dwork, Cynthia, et al., "Pricing via Processing or Combatting Junk Mail," Draft of full version, preliminary version of this paper was presented at Crypto '92, pp. 1-11.

eSOFT.COM, "InstaGate EX2-the Firewall with a Future," eSoft Incorporated, 2001, 9 pages.

"eTrust Secure Content Manager," Computer Associates International Inc., 2003, pp. 1-7.

"Fighting Fire with Fire," Computer Reseller News, n757, pp. 143-152, Oct. 6, 1997, 14 pages.

"F-Secure Internet Gatekeeper," F-Secure Data Sheet, F-Secure Corporation, 2 pages.

Google Groups, "MIME mail bombs," Message 1 thread from Selden E. Ball Jr., dated Feb. 28, 1995, 3 pages.

Google Groups, "PMDF and VSWEEP Virus Scanner," Message 1 thread from Eileen Byrne Telecom 617-386-2181, dated Nov. 13, 1995, 2 pages.

Google Groups, "Virus Scanning", Message 1 Thread from John F. Reddington dated Jul. 25, 1995, 5 pages.

Google Groups, "Virus Scanning", Sara.Appleyard, Sep. 8, 1996, 5 pages.

"Integralis Announces MIMEsweeper Compatible with Check Point FireWall-1 on Single NT Server," Checkpoint Software Technologies LTD., Sep. 16, 1996, 2 pages.

Kent, Stephen T., "Internet Privacy Enhanced Email," Communications of the ACM, vol. 36, No. 8, Aug. 1993, pp. 48-60.

Lemos, Robert, "Paying Up for a Spam Seal of Approval," Jun. 24, 2002, http://news.com.com/2100-1001-938976.html, printed Feb. 19, 2003, pp. 1-3.

Mason, Justin, "SpamAssasin Prehistory: filter.plx," [Online], [retrieved on Jun. 6, 2005]. Retrieved from the internet:http://spamassasin.apache.org/prehistory/.

Mccullagh, Declan, "Spam Blocker charges for e-mail," CNET Newsc.com, Feb. 19, 2003, Retrieved from <http://www.dotcomeon.com/payformail.htm>, printed Jun. 30, 2005, 2 pages.

"New Product 'E-Mail Virus Wall' protects companies from e-mail-borne viruses, including new macro viruses," Business Wire, p. 02160157, Feb. 16, 1996, 3 pages.

Nicholas, Nick, "Realtime Blackhole List, Spamware Defined," downloaded on May 27, 2004 from <http://mail-abuse.org/rbl/spamware.htm, 2 pages.

Olawsky, Duane et al., "Developing and Using a 'Policy Neutral' Access Control Policy," Secure Computing Corporation, Dec. 2, 1996, pp. 60-67.

Omniva, "Omniva Policy Manager," Technical White Paper, Ominiva Policy Systems, Jan. 2004, pp. 1-23.

Oppliger, Rolf, "Internet Security; Firewalls and Bey," Communication of the ACM, vol. 40, No. 5, May 1997, pp. 92-102.

Postini Inc., "Postini Perimeter Manager: the Industry's Leading Email Security and Management Solution," Postini Inc., 2004, 4 pages.

"Prevention of Forged-Spam email via Sendmail (Relay Disable)" <http://docsrv.sco.com/MM_ admin/mmadminC.spam_forge.html>, Nov. 1999.

"Product Overview- IronMail: The Secure Email Gateway Appliance," CipherTrust, 2 pages.

Prolin, P. et al., "Network Security Probe", Telecom Bretagne, Nov. 1994, pp. 229-240.

"Raptor Systems and Trend Micro to Develop Integrated Firewall/Virus Wall; Security Partnership to Protect Against Unauthorized Access and Viruses," Business Wire, p. 05030072, may 3, 1996, 2 pages.

Rhyolite Software, "Distributed Checksum Clearinghouse," [Online] [Retrieved on Jun. 20, 2005], retrieved from the internet: http://www.rhyolite.com/anti-spam/dcc, pp. 1-5.

Sullivan, Andy "Buffalo Spammer' Sentenced to 3-1/2 to 7 years", U.S. National-Reuters downloaded on May 27, 2004 from <http://news.yahoo.com/news?tmpl=story&u=nm/20040527/us_nm/tech_spam_dc>, 2 pages_.

"Surf Control E-mail Filter," http://www.surfcontrol.com/uploadedfiles/SEF_datasheet.pdf, SurfControl plc., 4 pages.

"Symantic Ships Norton AntiVirus for Internet Email Gateways," PR Newswire, p. 0224SFM068, Feb. 24, 1997, 4 pages.

"The Elm Filter System Guide," CETS Answers, Computing and Educational Technology Services, University of Pennsylvania, Jun. 24, 2003, 8 pages.

"The Elm Filter System Guide, What the Filter Program is, and How to Use It," San Diego State University Rohan Academic Computing, May 29, 1996, pp. 1-8, available online at http://www-rohan.sdsu.edu/filter.html.

Trend Micro, "Policy-based Antivirus and Content Security for the Messaging Gateway," White Paper, Trend Micro Interscan Messaging Security Suite, Jun. 2002, pp. 1-20.

Trumbo, Jan et al., "Features: Big, Bad E-mail," Network Computing, Oct. 8, 1996, 4 pages, available at http://www.nwc.com/716/716f2.html.

Weisband, Suzanne P. et al., "Managing User Perceptions of Email Privacy," Communications of the ACM, vol. 38, No. 12, Dec. 1995, pp. 40-47.

1997 Press Release, "Trend Micro Sues Integralis for Gateway Anti-VirusPatent Infringement, Seeks to End Sales of E-mail, Internet Gateway Product," Trend Micro, Jul. 8, 1997, 2 pages.

* cited by examiner

MANAGING CONNECTIONS AND MESSAGES AT A SERVER BY ASSOCIATING DIFFERENT ACTIONS FOR BOTH DIFFERENT SENDERS AND DIFFERENT RECIPIENTS

PRIORITY CLAIM AND RELATED APPLICATIONS

This application claims domestic priority under 35 U.S.C. §119(e) from prior U.S. provisional application Ser. No. 60/575,658, entitled "PROVIDING TEMPORARY ACCESS TO A NETWORK DEVICE, USING DESTINATION DOMAIN-BASED BOUNCE PROFILES, MONITORING THE FLOW OF MESSAGES FROM SENDERS, AND CONTROLLING THE FLOW OF MESSAGES FROM SENDERS," filed May 29, 2004, naming Paul J. Clegg, Charlie S. Slater, R. Brian Harrison, Lonhyn Jasinskyj, Ben Cottrell, Eric Huss, Craig Sprosts, Krishna Srinivasan, Peter Schlampp, Shun Chen, Robert Brahms, Daniel Quinlan, and Brennan H. Evans as inventors, the entire disclosure of which is hereby incorporated by reference for all purposes as if fully set forth herein.

This application is related to: (1) co-pending non-provisional application Ser. No. 11/139,090, filed concurrently with the present application, entitled "MONITORING THE FLOW OF MESSAGES RECEIVED AT A SERVER," naming Charlie S. Slater, Paul J. Clegg, Brennan H. Evans, and Peter Schlamp as inventors, and (2) co-pending non-provisional application Ser. No. 11/139,114, filed concurrently with the present application, entitled "MANAGING CONNECTIONS, MESSAGES, AND DIRECTORY HARVEST ATTACKS AT A SERVER," naming Paul J. Clegg, Eric Huss, Craig Sprosts, Krishna Srinivasan, Shun Chen, Robert Brahms, and Daniel Quinlan as inventors.

FIELD OF THE INVENTION

The present invention generally relates to processing messages, and more specifically, to managing connections for receiving electronic messages at a server from different senders and for managing the electronic messages received at the server for different recipients.

BACKGROUND

The approaches described in this section are approaches that could be pursued, but not necessarily approaches that have been previously conceived or pursued. Therefore, unless otherwise indicated, the approaches described in this section are not prior art to the claims in this application and are not admitted to be prior art by inclusion in this section.

Mail transfer agents (MTA's) typically receive a large number of email messages from many different senders for delivery to many recipients. The number of email messages can range from hundreds of messages per hour to hundreds of thousands of messages per hour. Because of the increasing problems of the tremendous volume of unsolicited commercial email (i.e., spam) and from a significant percentage of email messages being infected with viruses, administrators of MTA's would like to be able to control the number of connections to the MTA's and to manage the delivery of the many email messages to in an easy to administer and efficient manner as part of the efforts to deal with spam and virus infected email messages.

However, traditional approaches for managing the flow of email messages through an MTA allow for handling senders and recipients of the email messages separately. For example, if the administrator of the MTA has observed that a particular Internet Protocol (IP) address has been sending a large amount of spam, the administrator can configure the MTA to refuse to accept email messages from the particular IP address. Over time, the administrator will likely identify a large number of IP addresses that send spam to the MTA, and for each such IP address, the administrator must separately configure the MTA to refuse email messages. The same situation can arise for email messages from particular IP addresses that are identified as being infected with a virus.

Due to the growing proliferation of spam and viruses, the administrator is faced with the dilemma of either constantly monitoring the flow of email messages for spam and virus infected email messages and continually reconfiguring the MTA to reject email messages from the offending IP addresses, or the administrator can limit the time spent in such efforts to dealing with just the biggest sources of such offending email messages while letting other smaller sources go unchecked.

Similarly, there are a large number of recipients for the large number of email messages handled by the MTA. Traditional approaches allow the administrator to configure the MTA to always allow or always block a particular recipient, but the MTA must be configured separately for each recipient. Furthermore, there are situations in which a sender of a large number of email messages is incorrectly identified as a spammer, and as a result, the administrator configures the MTA to reject email messages from the spammer's IP address. However, when the sender attempts to contact the administrator of the MTA to determine why the sender's email messages are being rejected, that inquiry typically comes from the same blocked IP address, and as a result, the sender who is incorrectly identified as a spammer must use other means to contact the administrator, which can be significantly more inconvenient for the sender and can result in a worsening of the relationship between the sender and the administrator of the MTA.

Based on the foregoing, it is desirable to provide improved techniques for managing the flow of email messages to an MTA that can enable the administrator of the MTA to more efficiently and effectively deal with different senders of undesired email messages. Furthermore, there is a need for an approach for more effectively processing email messages at an MTA that can enable the administrator to more efficiently configure the MTA to handle email messages addressed to different recipients served by the MTA.

BRIEF DESCRIPTION OF THE DRAWINGS

The present invention is depicted by way of example, and not by way of limitation, in the figures of the accompanying drawings and in which like reference numerals refer to similar elements and in which.

DETAILED DESCRIPTION

Figure 1:
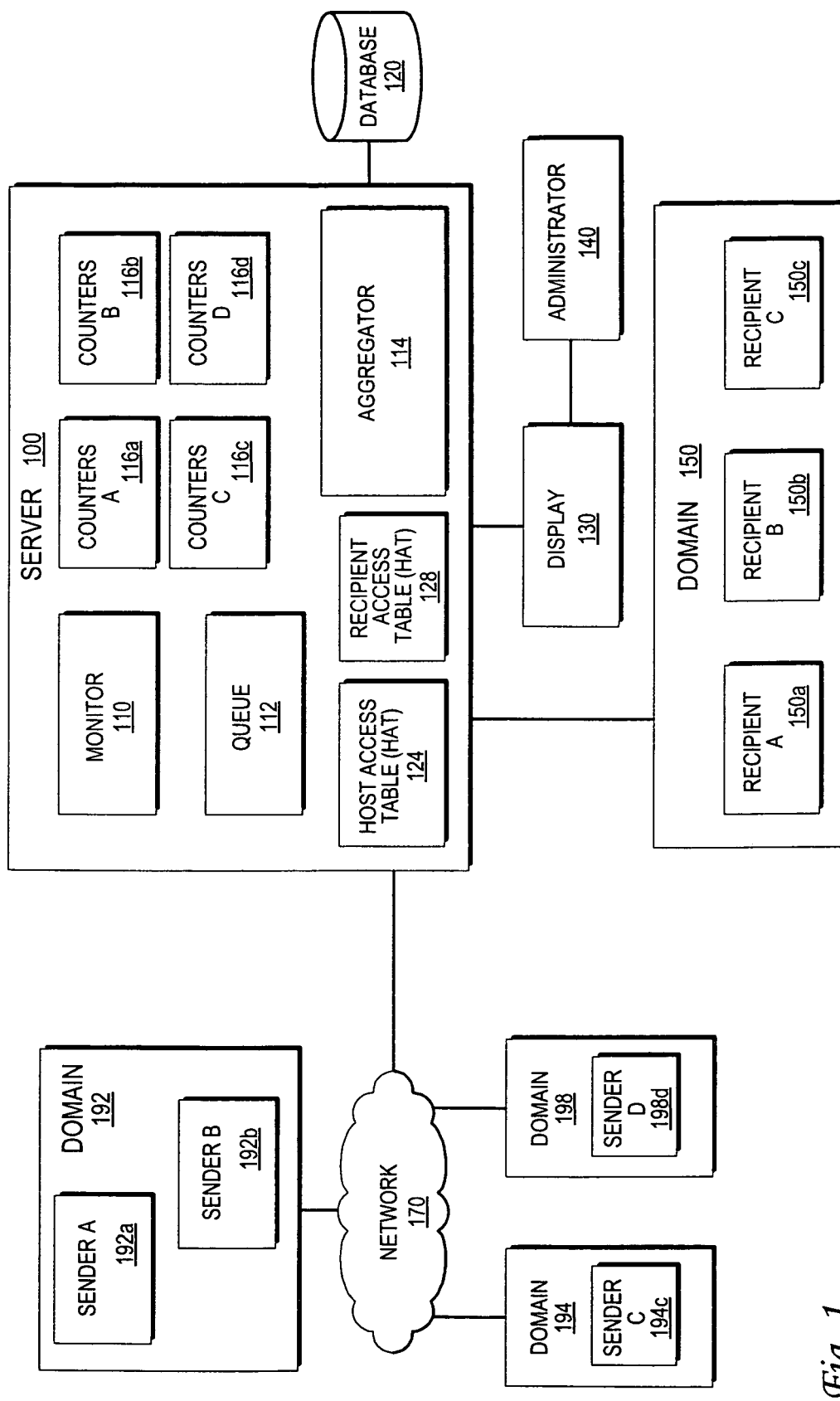
FIG. 1 is a block diagram that depicts a high level overview of a system for managing connections and email messages received by a server, according to an embodiment.

A method and apparatus for managing connections and email messages received by a server from different senders and for different recipients is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are depicted in block diagram form in order to avoid unnecessarily obscuring the present invention.

In the following description, the various functions shall be discussed under topic headings that appear in the following order:

I. STRUCTURAL AND FUNCTIONAL OVERVIEW
  A. Introduction
  B. Structural Overview of Managing Connections and Email Messages
  C. Functional Overview of Managing Connections and Email Messages
II. MANAGING CONNECTIONS FROM DIFFERENT SENDERS
  A. Introduction to Managing Connections at a Server from Different Senders
  B. Connection Attributes
  C. Sender Identifiers and Sender Identifier Groups
  D. Actions for Connections
  E. Host Access Table (HAT)
  F. Default Rules in the HAT
  G. Parameters in the HAT
III. MANAGING EMAIL MESSAGES FOR DIFFERENT RECIPIENTS
  A. Introduction to Managing Email Messages at a Server for Different Recipients
  B. Recipient Identifiers
  C. Actions for Recipients
  D. Recipient Access Table (RAT)
  E. Parameters in the RAT
  F. Using the RAT to Specify Exceptions for the HAT
  G. Default Rules in the RAT
IV. IMPLEMENTATION MECHANISMS AND EXAMPLES
  A. Example HAT
  B. Example RAT
  C. Additional Parameters for Use in the HAT and RAT
  D. Aggregated Time-Based Counters
  E. Example GUI for Managing Connections and Email Messages
  F. Collecting and Aggregating Message Information
  G. Managing Information Relating to Senders of Electronic Messages
  H. Determining a Reputation Score for a Sender
  I. Controlling Mail Injection
  J. Controlling the Number of Connections Made to a Recipient Domain
  K. Limiting Directory Harvest Attacks
  L. Command Line Interface Examples
V. HARDWARE OVERVIEW
  A. General Hardware Overview
  B. Hardware Examples
VI. EXTENSIONS AND ALTERNATIVES

I. STRUCTURAL AND FUNCTIONAL OVERVIEW

A. Introduction

Techniques are provided for managing connections and messages at a server, such as an MTA, by associating different actions for handling connections from different senders and different actions for handling electronic messages for different recipients. For example, a mapping can be used to associate different sender identifiers with different actions so that incoming connections to the MTA from different senders can be handled differently based on the specified actions. As another example, a mapping can be used to associate different recipient identifiers with different actions so that email messages received at the MTA for different recipients can be handled differently based on the specified actions.

In mapping different senders to different actions for managing connections to an MTA, one or more sender identifiers or sender identifier groups are used. For example, a sender identifier can be any identifier that is based on the sender of an email message or the host from which an incoming connection to an MTA originates for injecting email messages into the MTA. Specific examples of sender identifiers include, but are not limited to, the following: a network address, an Internet Protocol (IP) address, a partial IP address, a range of IP addresses, a primary domain, a subdomain, a fully qualified domain name (FQDN), a partial FQDN, a classless interdomain routing (CIDR) block, a partial CIDR block, a subnet, an organization identifier, a network owner, a reputation score, and a range of reputation scores.

A sender identifier group associates two or more sender identifiers together such that the senders associated with the different sender identifiers for the sender identifier group are mapped to the same action through the mapping of the sender identifier group to the action.

Actions for handling incoming connections from different senders can include, but are not limited to, accepting the connection, relaying the connection, rejecting the connection, or refusing the connection at the transmission control protocol (TCP) level. For example, a set of several different sender identifiers can be mapped to an "accept" action so that connections from the senders associated with those sender identifiers are accepted by the MTA, whereas a sender identifier group can be mapped to a "reject" action so that any connections from senders associated with the sender identifiers in the sender identifier group are rejected.

A host access table (HAT) can be used to map actions to sender identifiers, such as by using a list of rules that each map one or more sender identifiers (or sender identifier groups) to one or more actions. Rules in the HAT can also include one or more parameters for managing the connections from the senders, such as a limit on the maximum number of connections from a sender identifier or sender identifier group at a given time. The rules in the HAT can be in the form of an ordered list so that if more than one rule could be applied for a particular sender identifier, the rule used for that particular sender identifier is the first rule determined to match that particular sender identifier. Also, the rules can include a default rule so that any sender identifiers that do not match any of the other rules in the HAT are handled according to the default rule.

In mapping different recipients to different actions for managing email messages by the MTA, one or more recipient identifiers or recipient identifier groups are used. For example, a recipient identifier can be any identifier that is based on the recipient of an email message. Specific examples of recipient identifiers include, but are not limited to, the following: a full email address, a partial email address, a fully qualified domain name (FQDN), a partial FQDN, a username, and a partial username.

A recipient identifier group associates two or more recipient identifiers together such that the recipients associated with the different recipient identifiers for the recipient identifier group are mapped to the same action through the mapping of the recipient identifier group to the action.

Actions for handling email messages for different recipients can include, but are not limited to, accepting the email message for the recipient(s) associated with the recipient identifier and rejecting the email message for the recipient(s) associated with the recipient identifier. For example, a set of several different recipient identifiers can be mapped to an "accept" action so that email messages for the recipients associated with those recipient identifiers are accepted for delivery by the MTA, whereas a recipient identifier group can be mapped to a "reject" action so that any email messages for recipients associated with the recipient identifiers in the recipient identifier group are rejected and therefore not delivered.

A recipient access table (RAT) can be used to map actions to recipient identifiers, such as by using a list of rules that each map one or more recipient identifiers (or recipient identifier groups) to one or more actions. Rules in the RAT can also include one or more parameters for handling the email messages for recipients associated with the recipient identifiers, such as a response code, a response text message, and a banner text message. The rules in the RAT can be in the form of an ordered list so that if more than one rule could be applied for a particular recipient identifier, the rule use for that particular recipient identifier is the first rule determined to match that particular recipient identifier. Also, the rules can include a default rule so that any recipient identifiers that do not match any of the other rules in the RAT are handled according to the default rule.

Finally, the RAT can include one or more rules that are used as exceptions to application of one or more rules in the HAT. For example, the RAT can include a rule that maps the username "postmaster" to an "accept" action so that email messages that would otherwise be excluded by a rule in the HAT (e.g., for exceeding the number of allowed connections or the number of recipients for a sender identifier) are nevertheless accepted and delivered to the "postmaster" recipient. This can be helpful in situations where a sender is having connections or email messages rejected based on the sender's IP address, and administrator of the MTA wants to allow such a sender to send an email to the "postmaster" address for a domain serviced by the MTA to allow the sender to inquire as to why the sender's connections or messages are being rejected. Otherwise, the sender's email inquiring as to the reason for the rejections would likely be rejected just like any other connection or message from the sender's IP address.

B. Structural Overview of Managing Connections and Email Messages

FIG. 1 is a block diagram that depicts a high level overview of a system for managing connections and email messages received by a server, according to an embodiment. For simplicity, FIG. 1 only depicts a limited number of senders of email messages and recipients of those email messages, although in practice any number of senders and recipients can be accommodated by the approaches described herein.

FIG. 1 depicts a server 100 that is communicatively coupled to a network 170 that is also communicatively coupled to domains 192, 194, 198. For example, server 100 can be implemented as an MTA connected to the Internet to which a number of domains are also connected. For simplicity, FIG. 1 depicts only three domains, but in practice there can be any number of domains communicatively coupled to network 170.

As shown in FIG. 1, domain 192 includes a sender A 192a and a sender B 192b, domain 194 includes sender C 194c, and domain 198 includes sender D 198d. However, in practice each domain can include any number of senders.

Server 100 is communicatively coupled to a display 130 that is used to present information to an administrator 140, such as through a browser-based graphical user interface (GUI). Server 100 is also communicatively coupled to a database 120 that can be used to store information generated as part of a mail flow monitoring process. Finally, server 100 is communicatively coupled to a domain 150 that includes recipients 150a-150c that are identified as a recipient A 150a, a recipient B 150b, and a recipient C 150c.

Server 100 includes a monitor 110, a queue 112, an aggregator 114, a host access table (HAT) 124, a recipient access table (RAT) 128, and a set of counters 116a-116d that are identified as counters A 116a, counters B 116b, counters C 116c, and counters D 116d.

Monitor 110 determines connection information for incoming connections to server 100 and message information for email messages received by server 100 from the senders of the email messages. Incoming connections can be processed according to HAT 124. Some incoming connections may be rejected and thus no email messages are typically received over the rejected connections, while other incoming connections are accepted and one or more email messages are typically received over the accepted connections.

The connection information and message information is stored in queue 112 that can be subsequently processed by aggregator 114 to aggregate the connection information for connections to server 100 from different senders and to aggregate the message information for message information for the email messages from different senders for the recipients serviced by server 100. After the message information for an email message is stored in queue 112, the processing of the email message is performed, which can include application of RAT 128. Depending on the actions from the RAT 128, the email message may or may not be delivered to the intended recipient in domain 150, such as recipient A 150a, recipient B 150b, or recipient C 150c.

By having monitor 110 store the message information in queue 112 for subsequent processing by aggregator 114, the impact of the monitoring process on the handling of incoming connections and the subsequent flow and processing of email messages by server 100 is minimized. The analysis of the information stored in queue 112 by aggregator 114 may lag the receipt of email messages by server 100 by a relatively short time, such as a few seconds or a couple of minutes, so that the aggregate information produced by aggregator 114 is generated substantially in real time with the receipt of email messages by server 100.

As a specific example, server 100 can create a "mailFlowHost" object for each IP address and store the objects in an in-memory dictionary, which is represented by queue 112 in FIG. 1. The key to the dictionary is a tuple containing the remote IP address, local IP address, remote port, and local port. For a current time period, such as the current minute, each mailFlowHost object records message information in 10 second intervals. An in-memory dictionary, referred to as the "current dictionary," stores the information for the current interval. At the end of each 10 second interval, the "old" dictionaries are stored in an interval table, which are represented in FIG. 1 by counters A 116a, counters B 116b, counters C 116c, and counters D 116d.

As message information is obtained from the incoming email messages, monitor 110 gets the mailFlowHost object for the current interval from the current dictionary until the current time minute is over, after which monitor 110 creates new mailFlowHost objects for the next minute, with the current dictionary being used for the current 10 second interval of the next minute in the same fashion. Data from the dictionaries corresponding to old minutes are aggregated and written to disk, such as database 120, and from there the minute data is rolled up into longer time periods, such as hours and days.

The mail flow monitoring approach described herein can track one or more statistics for each sender, such as the number of messages received by server 100 from the sender, the number of recipients for which email messages are received from the sender, the amount of information (e.g., the number of kB) received from the sender, and the number of connections received from the sender. The mail flow monitoring approach described herein can also track the later application of one or more policies to the email messages from the sender, such as how many are blacklisted, whitelisted, or greylisted, or the percentage of messages received from the sender in a particular time period that are determined to be spam or that fail a virus check.

At the end of periodic intervals, such as at the end of every minute, the information in counters A 116a, counters B 116b, counters C 116c, and counters D 116d are stored by aggregator 114 in database 120. Then counters A 116a, counters B 116b, counters C 116c, and counters D 116d can be reset to zero or replaced with new sets of counters to count for the next time interval, such as the next minute.

Although not shown in FIG. 1, a graph module can be included in server 100. The graph module accesses the data for a set of time intervals that is stored in database 120 and generates one or more graphs or plots to be presented through display 130 so that administrator 140 can review and analyze the data and then specify actions, as appropriate, for the handling of future email messages from a particular sender. For example, a GUI can include on display 130 a graph of the number of recipients injected to server 100 over the last hour from a particular sender, such as a specified IP address. The GUI can include a button to allow administrator 140 to ad the specified IP address to a blacklist, such that when administrator 140 clicks on the "blacklist" button, the IP address is included in a rule in HAT 124 that maps the specified IP address to a "blacklist" variable in HAT 124 that is defined elsewhere in HAT 124 to correspond to a reject action. As a result, future email messages from the specified IP address will be rejected.

Data stored in database 120 can also be aggregated in any of a number of ways. For example, the data in database 120 can be aggregated over longer time periods, such as by each hour for a day, and presented to administrator 140 by the graph module through display 130. Data stored in database 120 can also be aggregated for multiple senders, such as by combining data for sender A 192a and sender B 192b, and then displaying the compiled data on all email received from domain 192 to administrator 140 through display 130.

Server 100 can include other modules, components, and functions than those described with respect to FIG. 1 herein. For example, server 100 can include a spam policy module and a virus policy module for applying spam and virus policies, respectively. Also, the individual components of server 100 as depicted in FIG. 1 can be combined with each other, such as by combining monitor 110 and aggregator 114, or the individual components can be implemented as several different components, such as by implementing aggregator 114 as a time aggregator for aggregating message information over time and a sender aggregator for aggregating message information for two or more senders.

C. Functional Overview of Managing Connections and Email Messages

Figure 2:
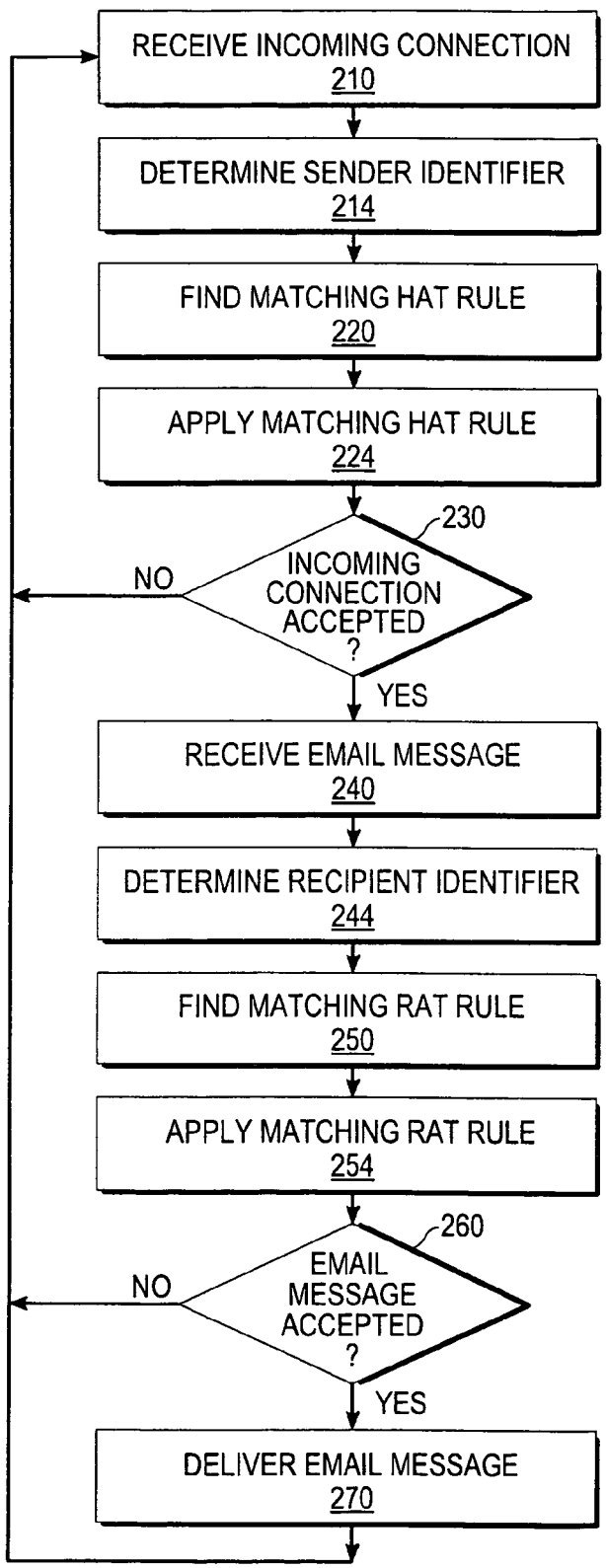
FIG. 2 is a flow diagram that depicts an approach for managing connections and email messages received by a server, according to an embodiment.

FIG. 2 is a flow diagram that depicts an approach for managing connections and email messages received by a server, according to an embodiment. For explanation purposes, FIG. 2 is described with reference to the system overview of FIG. 1, although the approach of FIG. 2 is not limited to the particular system depicted in FIG. 1. Also, FIG. 2 is described with reference to handling incoming connections and email messages at an MTA, although any type of electronic message and any server can be used with the approach depicted in FIG. 2. In addition, FIG. 2 is described with reference to HAT 124, although any mapping of sender identifiers to actions can be used, and RAT 128, although any mapping of recipient identifiers to actions can be used. Finally, FIG. 2 is described for one incoming connection, one email message, and one recipient of the email message, although any number of incoming connections, email messages, and recipients per email message can be used.

In block 210, the MTA receives an incoming connection from a sender. For example, server 100 receives an incoming connection from sender B 192b of domain 192 via network 170.

In block 214, the MTA determines a sender identifier for the sender from which the incoming connection is received. For example, server 100 identifies the IP address of domain 192 based on information transmitted with the incoming connection from the MTA of domain 192. However, other sender identifiers can be used, such as a reputation score for the IP address of domain 192 that is determined from a reputation service, such as SenderBase from IronPort Systems, Inc., of San Bruno, Calif., by sending a query to the reputation service for the IP address and receiving in return information for the IP address that includes the reputation score.

In block 220, the MTA uses the sender identifier to find a matching HAT rule. For example, server 100 uses the IP address of domain 192 to find a rule in HAT 124 that maps the IP address of domain 192 to an action.

In block 224, the MTA applies the matching HAT rule to the incoming connection. For example, if the matching rule in HAT 124 associates the IP address of domain 192 with an "accept" action, server 100 accepts the incoming connection and sends a message to the host of domain 192 that the connection is accepted. As another example, if the matching rule in HAT 124 associates the IP address of domain 192 with a "reject" action, server 100 accepts the incoming connection, sends the host of domain 192 a connection rejected message, and then terminates the connection without accepting any email messages from domain 192.

In block 230, if the connection is accepted, the process continues on to block 240, but if the connection is not accepted (e.g., rejected), the process returns to block 210 where a new incoming connection is received.

In block 240, the MTA receives an email message over the accepted connection. For example, server 100 receives an email from sender B 192b that is addressed to recipient C 150c. For purposes of explanation, the received email is assumed to have only one recipient email address, although in practice any number of recipient email addresses can be accommodated.

In block 244, the MTA determines a recipient identifier for the recipient of the email message. For example, server 100 can use the full recipient email address for recipient B 150b of the email message as the recipient identifier, although other recipient identifiers can be used, such as just the username portion of the recipient email address or the domain name portion of the recipient email address.

In block 250, the MTA uses the recipient identifier to find a matching RAT rule. For example, server 100 uses the full recipient email address to find a rule in RAT 128 that maps the full recipient address of recipient C 150c to an action.

In block 254, the MTA applies the matching RAT rule to the email message. For example, if the matching rule in RAT 128 associates the full recipient address of recipient C 150c with an "accept" action, server 100 accepts the email message for delivery. As another example, if the matching rule in RAT 128 associates the full recipient address of recipient C 150c with a "reject" action, server 100 rejects the email message so that a rejection response message is sent to sender B 192b and the email message is not accepted for delivery.

In block 260, if the email message is accepted, the process continues to block 270, but if the email message is not accepted (e.g., rejected), the process returns to block 210. Note that if the email message includes additional recipients, each recipient is used to determine a recipient identifier that is used to find a matching RAT rule that is then applied as appropriate. Similarly, if more than one email message is received over the accepted connection, each email message is handled the same as the example email message of this example.

In block 270, the MTA delivers the email message to the recipient. For example, server 100 delivers the email message to recipient C 150c of domain 150. The process then returns to block 210, although if additional email recipients or email messages were accepted for delivery, such email messages would be delivered to the intended recipients.

II. MANAGING CONNECTIONS FROM DIFFERENT SENDERS

A. Introduction to Managing Connections at a Server from Different Senders

Figure 3:
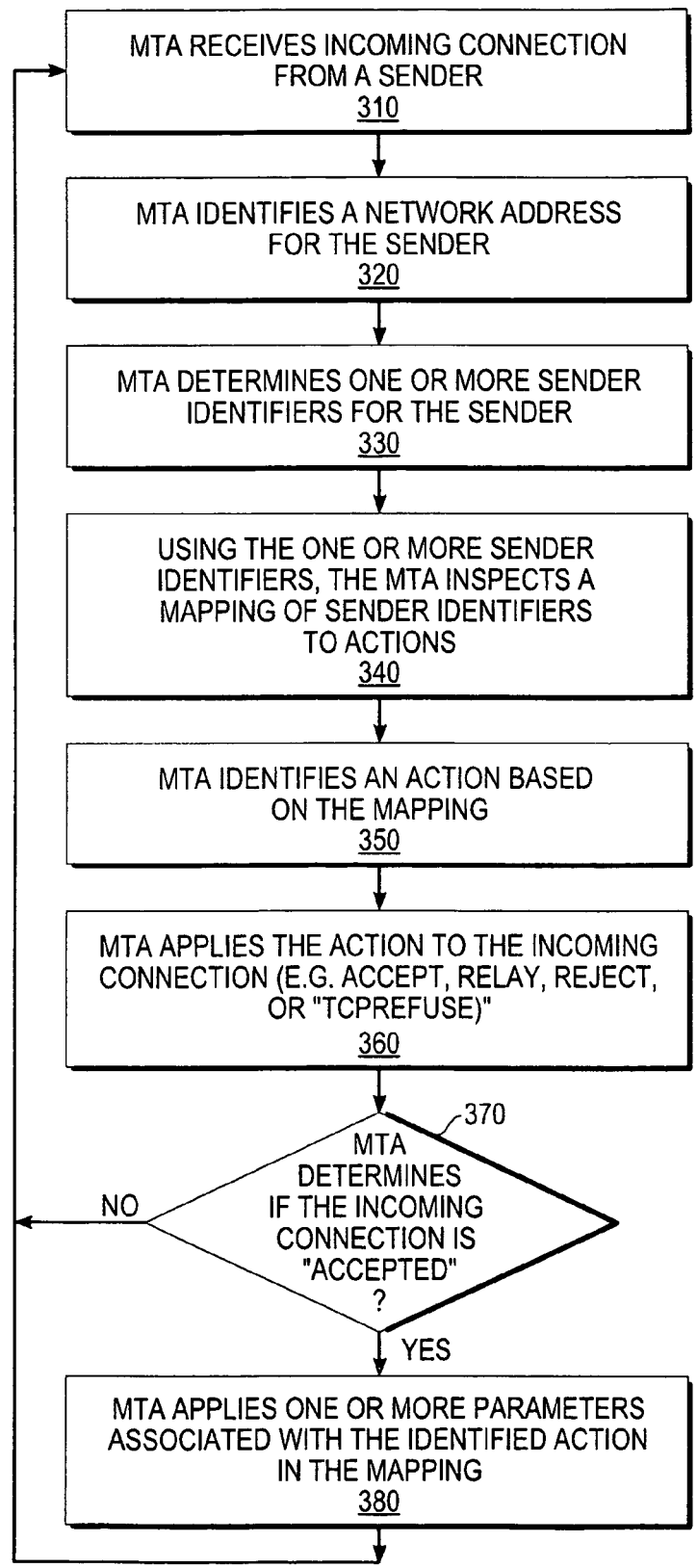
FIG. 3 is a flow diagram that depicts an approach for managing incoming connections between different senders and a server, according to an embodiment.

FIG. 3 is a flow diagram that depicts an approach for managing incoming connections between different senders and a server, according to an embodiment. For clarity, FIG. 3 is described with reference to one incoming connection from one sender, although in practice, any number of connections from any number of senders can be handled by the approaches described herein. Finally, FIG. 3 is described with reference to an MTA, although any server that handles incoming connections from any other servers can be used to implement the approaches described herein.

In block 310, the MTA receives an incoming connection from a sender. For example, server 100 receives an incoming connection from a host associated with domain 194 of FIG. 1, such as an incoming connection for delivering an email message from sender C 194c. Server 100 interacts with the injecting host using the simple mail transfer protocol (SMTP) by starting an SMTP conversation.

In block 320, the MTA identifies a network address for the sender. For example, server 100 identifies the IP address for domain 194 in the header information of the incoming connection.

In block 330, the MTA determines one or more sender identifiers for the sender. For example, server 100 can use the IP address as a sender identifier. As another example, server 100 can obtain the fully qualified domain name (FQDN) of the sender through a reverse domain name service (DNS) lookup with an existing DNS cache, and use the FQDN as a sender identifier. As yet another example, server 100 can submit a query to another server, such as a server that is part of the SenderBase service, to obtain the available information based on the IP address of the sender. Such information can include an organization name, an organization identifier, and a reputation score, and one or more of these types of information can be used as a sender identifier. For the following explanation, assume that the sender identifiers are the IP address of domain 194 and a reputation score of −3 from SenderBase.

In block 340, the MTA uses the one or more sender identifiers to inspect a mapping of sender identifiers to actions. For example, server 100 can inspect HAT 124 using the IP address of domain 194 and the reputation score −3 to find one or more rules that associate either the IP address or the reputation score with an action. As a specific example, assume that the HAT includes one rule that specifies a CIDR block that includes the IP address of domain 194 and another rule that specifies reputation scores between −10 and −1. As a result, server 100 can match the IP address of domain 194 to the first rule and the reputation score of −3 to the second rule.

In block 350, the MTA identifies an action based on the mapping. For example, server 100 in block 340 inspected HAT 124 and found two matching rules. Server 100 can pick one of the matching rules to be applied in any of a number of ways. For example, each rule can have a priority, and server 100 uses the rule with the highest priority while ignoring any other matching rules. As another example, HAT 124 can be organized as an ordered listing of rules, and when server 100 inspects HAT 124 starting from the first rule in the ordered listing, server 100 stops at the first matching rule and identifies the associated action as the action to be applied (e.g., only one rule would be identified as the matching rule in this case in block 340). As yet another example, server 100 can inspect the actions for each of the matching rules and use the most restrictive action (i.e., if one rule is "ACCEPT" and the other rule is "REJECT", server 100 selects the rule with the "REJECT" action) or the most permissive action (e.g., use the "ACCEPT" action instead of "REJECT"). In the event that two or more matching rules are deemed equivalent in the selection process (e.g., both matching rules have the same priority), server 100 can select the action based on any suitable method, such as by using the first matching rule in HAT 124 or by randomly selecting a rule from among the matching rules.

In block 360, the MTA applies the action to the incoming connection. For example, the typical actions in HAT 124 are "ACCEPT," "RELAY," "REJECT," and "TCPREFUSE." For the "ACCEPT" action, server 100 accepts the incoming connection and thereafter typically receives one or more email messages from the injecting host for delivery to one or more recipients of domain 150. For the "RELAY" action, server 100 accepts the incoming connection and relays any incoming messages as specified to other MTA's and then closes the connection, although generally no messages are delivered to any of the recipients of domain 150. For the "REJECT" action, server 100 performs what may be termed as a "polite"

rejection or refusal in which server 100 accepts the incoming connection, then sends a rejection response message to the injecting host over the connection informing the injecting host that the connection is rejected, and then server 100 terminates the connection. Generally, server 100 accepts no email messages over the connection while performing the "REJECT" action. Finally, for the "TCPREFUSE" action, server 100 performs what may be termed as an "impolite" rejection or refusal in which server 100 accepts the incoming connection but then immediate drops the connection without sending a rejection response message to the injecting host. Thus, the incoming rejection is refused at the transmission control protocol (TCP) level.

In block 370, if the incoming connection is "ACCEPTED," the process continues to block 380, and if not, the process returns to block 310 where the MTA handles another incoming connection from either the same or a different sender. For example, if server 100 determines in block 360 that the action is "ACCEPT" or "RELAY," the process continues to block 380, whereas if the action in block 360 is "REJECT" or "TCPREFUSE," the connection is terminated with little or no further action by server 100.

In block 380, the MTA applies one or more parameters that are associated with the identified rule in the mapping. For example, the matching rule that server 100 determines is to be applied can include the "ACCEPT" action and one or more parameters, such as a maximum number of connections. Server 100 can use a counter of the number of connections for the sender identifier, say counters A 116a in FIG. 1 that is counting the number of connections from the IP address for domain 194. If the specified maximum number of connections has been reached, server 100 terminates the connection, even though the matching HAT rule is to "ACCEPT" the incoming connection. As another example, the matching rule can specify a maximum number of recipients per hour, and server 100 checks counters B 116b that is counting the number of recipients injected by domain 194 in the current hour. If the maximum number of recipients has been reached, server 100 rejects any additional email messages for recipients in domain 150 and sends a rejection response message back to the MTA for domain 194.

For an accepted connection, after the email messages from the injecting host are received, the MTA terminates the connection. For example, if a certain amount of time has passed during which server 100 receives no further communication from the MTA for domain 194, server 100 terminates the connection with domain 194.

Also, although not illustrated in FIG. 3, the MTA can use another mapping of recipient identifiers to actions, such as RAT 128, in conjunction with the mapping of the sender identifiers to actions, such as HAT 124. For example, RAT 128 can include a rule that all messages addressed to the username "postmaster" at domain 150 are to be accepted, even if the HAT would otherwise indicate that the incoming connection is to be rejected or refused. Thus, RAT 128 can effectively include "exceptions" to the rules of HAT 124, which can be helpful in allowing a sender of email messages that are being blocked by server 100, such as for exceeding the maximum number of connections, for exceeding the maximum number of recipients, or for otherwise matching a HAT rule with a "REJECT" or "TCPREFUSE" action, to be able to contact administrator 140 for server 100 to inquire as to why the sender's connections or email messages are not getting through server 100.

B. Connection Attributes

Upon acceptance of a connection, one or more attributes of the connection can be determined and subsequently used to identify senders and associate sender identifiers to them, for which counters can be established and tracked to allow for the control of the flow of messages. For example, the following attributes can be determined for a connection:
 (1) IP address
 (2) Fully qualified domain name (FQDN)
 (3) SenderBase data, including:
   (a) SenderBase organization name
   (b) SenderBase organization identity/identifier
   (c) SenderBase organization subdivision mask
   (d) SenderBase organization flow control coefficient.

The IP address is determined when establishing the connection and can be used to obtain the other connection attributes. For example, to determine the FQDN, a reverse DNS lookup is used, with an existing DNS cache, to determine the name. If the IP address can be resolved to a name, a second DNS lookup is done on the retrieved name, and compared to the original IP address. If the IP addresses match, the FQDN is kept. On a per-injector basis, the user may configure the MTA to reject connections that do not properly reverse DNS, based on one of the following options: ignore the error (can be set as the default); immediately TCPREFUSE the connection; or REJECT data from the connection with a response having the appropriate SMTP error code (which the user can define).

If the system is configured to work with SenderBase, the recipient host can connect to the SenderBase server and submit a query for the available information based on the IP address. If the user has not configured the recipient host to use SenderBase or if SenderBase is not available, a default CIDR block can be used as the subdivision mask. The user can specify the CIDR block, and the system can be configured with a default value, such as "/24." When using SenderBase, a timeout can be configured to avoid slowing the injection rate of the host recipient due to the queries to the SenderBase server. The user can specify the timeout, and the recipient host can be configured to have a default value, such as 10 seconds, and a timeout value of "0" can specify that SenderBase lookups are to be disabled.

C. Sender Identifiers and Sender Identifier Groups

Any of a number of attributes can be used as a sender identifier for matching in the HAT, including but not limited to, one or more of the following: a network address, an Internet Protocol (IP) address, a partial IP address, a first range of IP addresses, a primary domain, a subdomain, a fully qualified domain name (FQDN), a partial FQDN, a classless interdomain routing (CIDR) block, a partial CIDR block, a subnet, an organization identifier (e.g., a SenderBase organization ID), a network owner, a reputation score, and a second range of reputation scores.

The flexibility in specifying the sender identifier allows the user to aggregate information in virtually any manner that the user desires for purposes of controlling the mail flow. For example, the user can list a single IP address on the left side of the HAT, and that single IP address gets up to the specified maximum number of recipients per time period for purposes of mail flow injection control. As another example, the user can specify a /24 CIDR block on the left side of the HAT, and then that group of IP addresses (up to 256 addresses) as a whole share the specified maximum number of recipients per time period. Thus, if just one of the addresses for the /24 CIDR block exceeds the limit, then neither that address nor any others in the /24 CIDR block can send messages for the rest of the time period, until the counter is reset (e.g., typically every hour).

As yet another example, a domain that is known to generate a lot of spam can be listed on the left side of the HAT and have a very low maximum number of recipients per time period threshold limit specified, thereby effectively preventing spam from that domain.

As yet another example, the mail flow monitor can help the user identify a spike in messages from a particular IP address, and the user can use a GUI button that is part of the mail flow monitor to add that IP address to the HAT and associate that added IP address with a policy that limits the number of recipients per time period to the user's desired level, or the user can even specify that the IP address should be blacklisted so that no messages are allowed from the IP address.

The mail flow monitor can track and record the number of recipients that are being rejected due to the maximum number of recipients per time period being exceeded by IP address or another sender identifier. As a result, the user can determine if a partner company or some other domain that the user wants to receive email messages from has been inadvertently limited in terms of the injection rate so that the partner company or domain can be whitelisted so that the email messages are no longer throttled or limited based on the HAT.

In some implementations, the SenderBase service is used to provide for more complex mail injection control. For example, the HAT can include a "use_sb" option (e.g., whether to use SenderBase) so that instead of using the left side of the rule in the HAT to match on, a new counter is determined based on the SenderBase information and matches are made on the SenderBase derived counter. As a specific example, SenderBase can provide information about who the organization is for an IP address, along with the SenderBase organization ID for the IP address and a specific CIDR block size (e.g., /24 is a typical value and may be used as the default value). As a result, the user can rely on SenderBase to categorize the information for the IP address and control mail flow based on the SenderBase derived counter.

As an example, consider the case in which SenderBase indicates that the company associated with a particular IP address owns the domain 1.2.x.y and all IP addresses below that, and that the company sells off those IP addresses to other companies in /28 CIDR blocks. The system can then distinguish between different /28 CIDR blocks that originate from the company, and thus for a particular IP address, the system can determine to which CIDR block the IP address belongs. As a result, the system can lump together all IP addresses for the CIDR block together and subject them to the same maximum recipient per time period limit. This allows the user to treat the IP addresses for one owner of a particular CIDR block acquired from the company separately from the other IP addresses of the company or from other CIDR blocks that the company sold. This can be beneficial when the company has sold some CIDR blocks to spammers, which the user wants to severely limit, and other CIDR blocks to more reputable organizations that the user does not wish to limit as harshly.

As yet another example, the user can rely on the SenderBase organization ID to control mail injection, thereby allowing the user to aggregate a number of disparate IP addresses that are associated with a single organization or company. For example, a particular organization may have two different subnets, and the user can establish a rule in the HAT that each subnet has a separate counter for determining the maximum number of recipients per time period. However, this requires that the user manage each subnet separately. Instead, the user can use the SenderBase organization ID, which is the same for each subnet, and have a single rule in the HAT based on the organization's SenderBase organization ID, and then a single counter and a single rule can be used to limit the recipients injected from both of the organization's subnets.

As another example, a company can have a large number of customers with IP addresses that are wildly disparate. However, because SenderBase associates the same organization ID for the company, regardless of which customers have which IP addresses, the user can have one entry in the HAT that indicates the company's SenderBase organization ID, and all the IP addresses for that company's customers are subject to the same counter for purposes of determining the maximum number of messages per time period or the maximum number of connections at a given time, or even for counting the number of invalid email recipient addresses for purposes of detecting and preventing a directory harvest attack.

The SenderBase information can be obtained by the system for each request for a connection to the system, with SenderBase returning the available information for the queried IP address. As an alternative, the user can cache the SenderBase data to improve performance.

As yet another example, the user can use a reputation score from SenderBase instead of an IP address or other more common sender identifier. For example, upon receipt of a request for a connection, the system can query SenderBase and obtain the reputation score corresponding to the IP address. The score can be compared to a range specified by the user (e.g., is the score between −10 and −5, thus indicating a low reputation on the −10 to +10 reputation score scale). In such a situation, the action to take can be to blacklist the IP address, so that no further messages are accepted. This approach allows the user to rely on SenderBase and the reputation scores to determine how to control mail flow, such as in this example to blacklist likely spammers and other less than reputable IP addresses.

As yet another example, a HAT entry can be based on a remote blacklist function. As a specific example, the system can be configured to take the IP address of an incoming connection, reverse the numbers (e.g., an IP address of 1.2.3.4 becomes 4.3.2.1) and append the name of a query DNS server. If the DNS server sends a response back for the effective machine represented by the reversed IP address, that indicates that the DNS server has a record of the reversed IP address in the DNS server's database. Because such databases are typically full of less than reputable IP addresses, the HAT entry can specify that any such IP addresses be blacklisted. Similarly, a query can be sent to other servers, such as Bonded Sender that includes a list of reputable IP addresses, and any that are included in such a list can be specified in the HAT to be whitelisted.

The use of other server's databases that include blacklists, whitelists, or other maintained lists of IP addresses that are characterized in an organized manner allows the user of the MTA to write general rules in the HAT based on the results of queries to such databases, thereby minimizing the work of the user and relying on the ability of those other servers to characterize the plethora of IP addresses as either good or bad.

Examples of sender identifiers, which may also be referred to as "host specifications," are given below. Multiple identifiers can be used, as well as being grouped together.

n.n.n.n—IP address.
n.n.n.|n.n.n|n.n.n|n.|n—partial IP addresses.
n.n.n.n-n|n.n.n-n.|n.n-n.|n-n.—range of IP addresses.
fqdn—fully qualified domain name.
.partialhost—everything with the partialhost domain.
n/c|n.n/c|n.n.n/c|n.n.n.n/c—CIDR address blocks.
sbo:<something>—SenderBase organization ID.
sbrs[n1:n2]—SenderBase reputation score ("x" matches if n1<=x<n2).
ALL—special keyword that matches ALL addresses (used as a catch-all for when no previous rule matches).

D. Actions for Connections

The mapping of sender identifiers to actions can be implemented as a set of rules, such as those found in a host access table (HAT). In most implementations, the following five actions are included, although other implementations can include more or fewer actions than those described below:
  (1) ACCEPT—the connection is accepted, with injection limited by the recipient access table (RAT).
  (2) RELAY—the connection is accepted, and injection to any recipient is allowed (the RAT is bypassed).
  (3) REJECT—the connection is refused, with the sender getting a 4xx or 5xx SMTP message, but no messages are accepted (e.g., a polite refusal).
  (4) TCPREFUSE—the connection is accepted but immediately dropped, so that the sender receives nothing in return (e.g., refused at the TCP level; a not so polite refusal).
  (5) CONTINUE—the mapping is ignored, and processing of the HAT continues, and if the connection matches a later entry that is not "CONTINUE," that later matching entry is used instead.

E. Host Access Table (HAT)

A host access table (HAT) as described herein is one example of a mapping of sender identifiers to actions. However, any suitable mapping that associates one or more sender identifiers or sender identifier groups to one or more actions can be used in a particular implementation.

The following description of the HAT is just one example of how the HAT can be implemented, and the approaches described herein are not limited to this or any other particular implementation of the HAT in particular or of a mapping of sender identifiers to actions in general.

In this example, a row in the HAT consists of four parts: (1) an entry name, referred to as a "label", (2) a host specification, referred to as "hosts", that can be implemented by listing one or more sender identifiers, sender identifier groups, or a combination thereof, (3) an access rule, referred to as "access" that specifies a particular action to be taken for the associated hosts, and (4) a parameter list, referred to as "params". These four items are defined as follows:
  (1) "label"—a label is a name given to a HAT entry and in some implementations, obeys a naming convention such as that the label starts with a letter or underscore, but after the initial character, the label can include letters, numbers, underscores, or hyphens.
  (2) "hosts"—a host specification, and can include more than one listed host.
  (3) "access"—is the selected basic access rule (e.g., "ACCEPT", "RELAY", "REJECT", "TCPREFUSE", or "CONTINUE").
  (4) "params"—a list of parameter name/value pairs.

In some implementations, the hosts are listed in order from top to bottom. When a search is made of the ordered list of rules from top to bottom, the first non-CONTINUE rule to match is used.

F. Default Rules in the HAT

In some implementations, the HAT includes one or more default rules that allow the user to specify actions and parameters for sender identifiers that otherwise do not match other more specific rules. For example, if the HAT is organized as on ordered list of rules where the first rule to match is used, rules with more specific sender identifiers can be listed first, such as sub-domains for a particular domain or particular IP addresses in a range of IP addresses. Following the specific rules, another "default" rule can be included for the entire particular domain or the range of IP addresses. When the HAT is applied for an incoming connection, if the particular sender identifier for the incoming connection matches the more specific rules that are higher up in the ordered listing of rules in the HAT, those rules and their associated actions will be applied to the incoming connection. But if the sender identifier does not match one of the more specific rules, then the default rule for the particular domain or range of IP addresses can be used. In this fashion, the administrator can specify a standard or default action for a group of sender identifiers, but the administrator can also use the more specific rules and include them higher up in the HAT to effectively function as exceptions to the default rules.

In some implementations, a special identifier can be used to implement one or more default rules. For example, a sender identifier of "ALL" can be used to denote any sender identifier, and a rule for the "ALL" sender identifier can be included as the last rule in the HAT, so that any sender identifier that does not match any of the other HAT rules will be match the default "ALL" rule. As a result, the administrator can ensure that all incoming connections will match at least one rule in the HAT. As another example, special identifiers of "PUBLIC" and "PRIVATE" can be used in rules located at or near the end of the HAT to specify default HAT rules for new public injectors and new private injectors.

G. Parameters in the HAT

One or more of the following parameters can be specified by host or sender identifier. In some implementations, the following parameters are allowed for the "ACCEPT" and "RELAY" actions, but not the other actions such as "REJECT" or "TCPREFUSE".
  (1) max_concurrency—specifies the maximum number of connections allowed from the host.
  (2) max_message_size—specifies the maximum message size from the host.
  (3) max_msgs_per_session—specifies the maximum number of messages that may be injected per session (typically counts successfully injected messages).
  (4) max_rcpts_per_msg—specifies the maximum number of recipients allowed per message.
  (5) smtp_banner_text—specifies the SMTP banner displayed when a host first connects.
  (6) smtp_banner_code—specifies the SMTP codes used in the SMTP banner.
  (7) tls—specifies whether or not TLS (transport layer security) is to be used or required (allowed values include "on", "off", and "require").

(8) max_rcpts_per_hour—specifies the maximum number of recipients that will be accepted for the given host, per hour (e.g., for injection control).
(9) max_rcpts_per_hour_code—specifies the SMTP response code to be given to a host who has exceed the maximum recipient per hour limit; can use a default of 452 per RFC2821.
(10) max_rcpts_per_hour_text—specifies the SMTP response message to be given a host who has exceed the maximum recipient per hour limit.
(11) use_sb—specifies whether to query SenderBase for information and whether to use the SenderBase information to craft the name of the counter to be incremented (allowed values include "on" and "off").
(12) netmask—specifies the size of the mask to apply to the IP address to craft the name of the counter to increment; allowed values are numbers between 0 and 32; a value of 0 means that a single counter will result for all IP addresses that matched this or a similarly masked HAT entry.

III. MANAGING EMAIL MESSAGES FOR DIFFERENT RECIPIENTS

Figure 4:
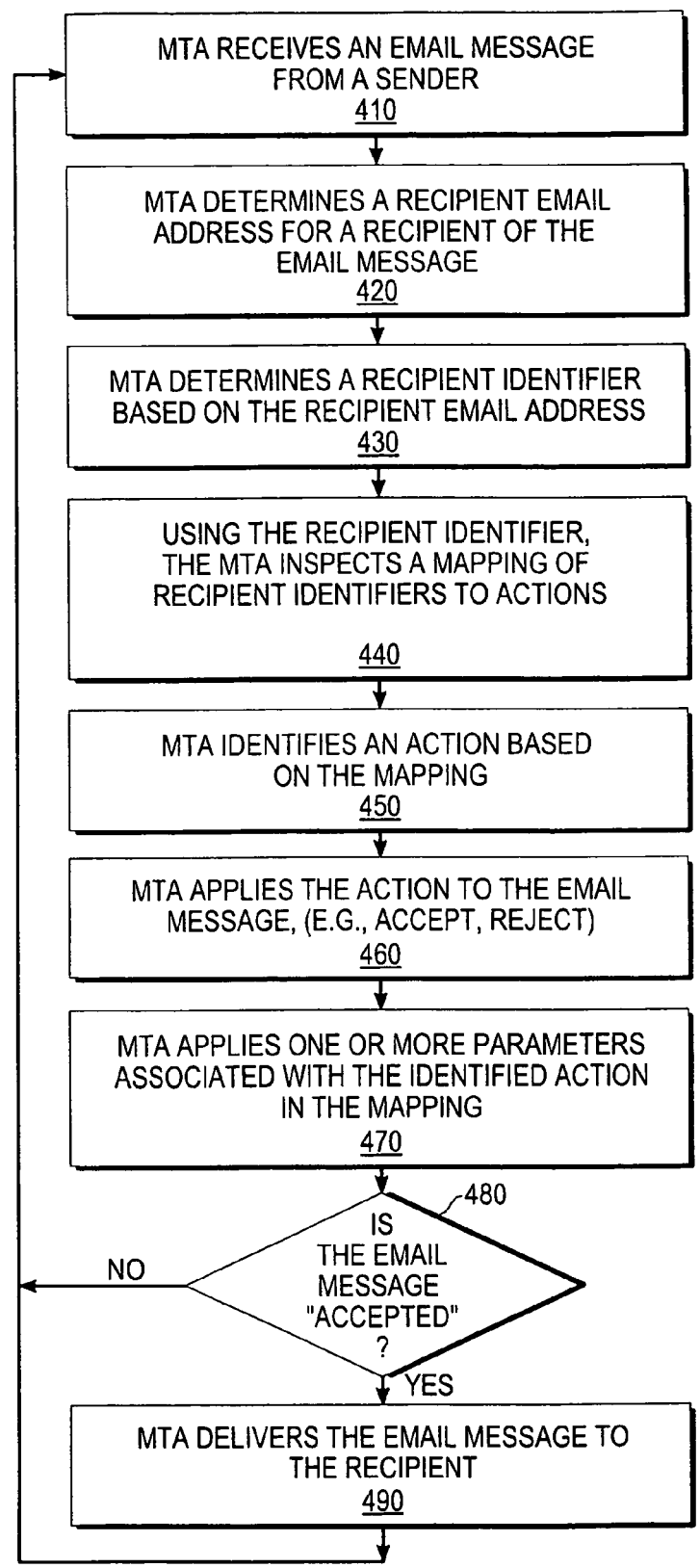
FIG. 4 is a flow diagram that depicts an approach for managing email messages received by a server for different recipients, according to an embodiment.

A. Introduction to Managing Email Messages at a Server for Different Recipients FIG. 4 is a flow diagram that depicts an approach for managing email messages received by a server for different recipients, according to an embodiment. For clarity, FIG. 4 is described with reference to one email message that is from one sender and addressed to one recipient, although in practice any number of email messages from any number of senders addressed to any number of recipients can be handled by the approaches described herein. Also, the email message described in the example of FIG. 4 has only one recipient email address, although email messages with any number of recipient email addresses can be handled by the approaches described herein. Finally, FIG. 4 is described with reference to an MTA and email messages, although any server that handles any kind of electronic messages can be used to implement the approaches described herein.

In block 410, the MTA receives an email message from a sender. For example, server 100 receives an email message from sender D 198d of domain 198 that is addressed to recipient A 150a of domain 150 that is served by server 100. The email message can be received over a connection that was established according to the approaches described herein with respect to managing connections, such as in the example illustrated and described with respect to FIG. 3 above.

In block 420, the MTA determines a recipient email address for a recipient of the email message. For example, server 100 examines the header information for the email message to identify the email address for recipient A 150a.

In block 430, the MTA determines a recipient identifier based on the recipient email address. For example, the recipient identifier can be some or all of the recipient email address for recipient A 150a. As another example, the recipient identifier can be a subdomain for domain 150.

In block 440, the MTA uses the recipient identifier to inspect a mapping of recipient identifiers to actions. For example, server 100 can inspect RAT 128 using the full recipient email address for recipient A 150a to find one or more rules that associate the recipient email address, or a portion of the recipient email address, with an action. As a specific example, assume that the HAT includes one matching rule for the subdomain portion of the recipient email address for recipient A 150a. However, other examples can include matching multiple RAT rules, such as in the example of matching multiple HAT rules as discussed above with reference to block 350.

In block 450, the MTA identifies an action based on the mapping. For example, server 100 in block 440 inspected RAT 128 and found one matching rule, and the action of the matching rule is identified as the rule to be applied to the email message. However, as another example, if multiple matching rules were identified in block 440, server 100 can determine the particular rule to be used in any of a number of ways, including those discussed above with reference to block 350 of FIG. 3.

In block 460, the MTA applies the action to the email message. For example, the typical actions in RAT 128 are "ACCEPT" and "REJECT." For the "ACCEPT" action, server 100 accepts the email message for delivery to recipient A 150a, and the "ACCEPT" action can include sending a message back to the host for domain 198 that the email message is accepted as part of the SMTP conversation. For the "REJECT" action, server 100 rejects the email message for delivery, and the "REJECT" action can include sending a message back to the host for domain 198 that the email message is rejected as part of the SMTP conversation. The rejection response message can include a suitable message or code indicating the reason for the rejection (e.g., the recipient email address is invalid, the recipient's inbox is full, etc.).

In block 470, the MTA applies one or more parameters associated with the identified rule in the mapping. For example, the matching rule that server 100 determines is to be applied can include an action and one or more parameters, such as a response code and a response text. As a specific example, if the action in block 460 is to "REJECT" the email message, the parameters can include a response code and a response text, and server 100 sends the specified response code and response text to the host injector for domain 198. Thus, RAT 128 can be used to have server 100 provide a more specific reason to the injecting host about the reason for the rejection by specifying a particular SMTP response code and an explanation in the response text.

In block 480, if the email message is "ACCEPTED," the process continues to block 480, and if not, the process returns to block 410 where the MTA handles another incoming email message. For example, if server 100 determines in block 460 that the action is to "ACCEPT" the email message, the process continues to block 480, whereas if the action in block 460 is to "REJECT" the email message, the process returns to block 410. In the situation in which the email message includes more than one recipient, the process can return to block 420 instead of block 410 to process the next recipient, and this loop continues until all recipients for the email message are processed.

In block 490, the MTA delivers the email message to the recipient. For example, server 100 delivers the email message from sender D 198d to the email inbox for recipient C 150c of domain C.

B. Recipient Identifiers

Examples of the recipient identifiers that can be used include but are not limited to one or more of the following user@domain—a complete email address.

fqdn—a fully qualified domain name.

.partialhost—everything with the partialhost domain.

user@—anything with the given username.

ALL—special keyword that matches ALL addresses, typically used as a catch-all when no other addresses are matched.

C. Actions for Recipients

The mapping of recipient identifiers to actions can be implemented as a set of rules, such as those found in a recipient access table (RAT). In most implementations, the following two actions are included, although other implementation can include more or fewer actions than those described below:
  (1) ACCEPT—the connection is accepted, with injection limited by the recipient access table (RAT).
  (2) REJECT—the connection is refused, the sender gets a 4xx or 5xx SMTP message, but no messages are accepted.

D. Recipient Access Table (RAT)

A recipient access table as described herein is one example of a mapping of recipient identifiers to actions. However, any suitable mapping that associates one or more recipient identifiers or recipient identifier groups to one or more actions can be used in a particular implementation.

The following description of the RAT is just one example of how the RAT can be implemented, and the approaches described herein are not limited to this or any other particular implementation of the RAT I particular or of a mapping of recipient identifiers to actions in general.

In this example, the RAT specifies which recipients will be accepted. The RAT specifies the recipient address, which may be a partial address or hostname, and whether to accept the recipient address or to reject the recipient address.

Optionally, the SMTP response to the "RCPT TO" command can be included for the recipient. Each injector has its own RAT. The hosts are listed in order from top to bottom, and in some implementations, the first rule to match is used.

E. Parameters in the RAT

One or more of the following parameters can be specified for each rule in the RAT:
  (1) smtp_banner_text—specifies the SMTP banner displayed when an email message is rejected.
  (2) smtp_response_code—specifies the SMTP codes used in the SMTP response.
  (3) smtp_response_text—specifies the SMTP text used in the SMTP response when an email message is accepted.

Typically, the banner text is used for a "REJECT" action, such as to provide the injector with a brief message relating to why the email message is rejected (e.g., "Email for the xyz-domain.com is not allowed."). Similarly, the response text is typically used for an "ACCEPT" action, such as to provide the injector with a brief message relating to why the email message is accepted (e.g., "Email for the postmaster is accepted."). The SMTP response code allows the administrator to specify in the RAT which SMTP code is to be used when accepting or rejecting a message based on a particular rule as opposed to a default SMTP code that the MTA is configured to otherwise provide. Note that any type of parameter can be used for any action in the RAT, not just those described herein.

F. Using the RAT to Specify Exceptions for the HAT

In some implementations, the RAT can be used to denote recipient addresses that are not subject to injection control by the HAT. For example, for some commonly used addresses, such as "postmaster" at a particular domain, the user does not want the system to limit messages addressed to such an address. As a specific example, if the system restricts message injection from an IP address, the user typically would want that sender of the restricted messages to be able to send a message to the "postmaster" email address to inquire as to why the sender's messages are being limited.

This type of approach can be particularly useful in situations in which an IP address is being limited by the system inadvertently, such an IP address associated with a partner company, as opposed to an IP address associated with a spammer. As a specific example, if a large company employs an outside firm to send out press releases, and most of the employees of the large company are on the list of recipients of such press releases, the outside firms efforts to send so many email messages to the large company's employees may appear to the MTA to be spam.

If such senders could not have a way in which to get a message through to the mail administrator of the recipient host, the user may have a difficult time learning that an IP address is being limited that should not be since the messages from the sender inquiring as to the limited message flow would itself be blocked by the injection control portion of the system.

G. Default Rules in the RAT

In some implementations, the RAT includes one or more default rules that allow the user to specify actions and parameters for recipient identifiers that otherwise do not match other more specific rules. For example, if the RAT is organized as on ordered list of rules where the first rule to match is used, rules with more specific recipient identifiers can be listed first, such as sub-domains for a particular domain serviced by the MTA or particular usernames. Following the specific rules, another "default" rule can be included for the entire particular domain or a range or group of usernames. When the RAT is applied for an email message, if the particular recipient identifier for the email message matches the more specific rules that are higher up in the ordered listing of rules in the RAT, those rules and their associated actions will be applied to the email message. But if the recipient identifier does not match one of the more specific rules, then the default rule for the particular domain or range or group of usernames can be used. In this fashion, the administrator can specify a standard or default action for a group of recipient identifiers, but the administrator can also use the more specific rules and include them higher up in the RAT to effectively function as exceptions to the default rules.

In some implementations, a special identifier can be used to implement one or more default rules. For example, a recipient identifier of "ALL" can be used to denote any recipient identifier, and a rule for the "ALL" recipient identifier can be included as the last rule in the RAT, so that any recipient identifier that does not match any of the other RAT rules will be match the default "ALL" rule. As a result, the administrator can ensure that all email messages will match at least one rule in the RAT. As another example, special identifiers of "PUBLIC" and "PRIVATE" can be used in rules located at or near the end of the RAT to specify default RAT rules for new public injectors and new private injectors.

IV. IMPLEMENTATION MECHANISMS AND EXAMPLES

A. Example HAT

The following is an example HAT that illustrates one implementation of the approaches described herein, although other implementations can include more features than those of the following example, and yet other implementations can include fewer or even none of the features of the following example.

On the right hand side of the following example HAT, actions can be listed, such as the basic access rules, or a variable can be used, as denoted by a leading $ as part of the variable name. Once a variable is specified, the variable can be used on the right hand side, with the values assigned to the variable being substituted automatically, which can provide a convenient form of shorthand notation.

The following is an example HAT:

For new injectors, default HATs can be established. For example, a new public injector can use "ALL ACCEPT" while a new private injector can use "ALL RELAY."

A HAT can be imported into the system, and comments made with the # sign are stripped out. The file can be internally represented with two data structures, one containing the list of behavior definitions, and the other containing the list of the mappings between hosts and behaviors.

Behavior definitions can be stored as a dictionary that is keyed off the names of the definitions. The value of each key is a tuple of a behavior code and a dictionary of parameters. The five behavior codes are "CONTINUE", "ACCEPT", "RELAY", "REJECT", and "TCPREFUSE". Any entry with a behavior that is not "CONTINUE" is one that may be matched during IP address processing.

The following is an example of a set of behavior definitions, following by a representation of the data structure.

```
# This is an example HAT table. Comments like these will be lost during
# the import process.
# Here we define three variables, "$BLACKLIST", "$WHITELIST", and "$GREYLIST"
# Variable definition lines may not have labels.
$BLACKLIST      REJECT   { smtp_banner_text="You have been blacklisted." }
$WHITELIST      ACCEPT   { max_concurrency = 600,
                           max_message_size = 20M,
                           smtp_banner_code = 220,
                           smtp_banner_text = "Hello there." }
$GREYLIST       ACCEPT   { max_message_size = 5M,
                           max_rcpts_per_hour = 5k,
                           max_rcpts_per hour_text =
"You have exceeded 5,000 recipients this hour.
If you feel this limit is too low, please contact mailadmin@mycompany.com",
                           use_sb = Y,
                           netmask = 24
                         }
# This next line is an example of a simple entry. It uses "IronPort_SB"
# as the label, uses an SenderBase ID as the host, uses the $WHITELIST
# predefined behavior as the action, and has the line comment of
# "IronPort Organization". This comment will be saved in the system and
# will always be mapped to this entry.
IronPort_SB: sbo:4988397762          $WHITELIST (IronPort Organization)
# This next example is indicative of what might have been merged in from an
# older HAT table. It has no label and does not refer to any predefined
# behavior.
10.1.1.2                RELAY
# This is an entry with no hosts.
EmptyList:             $GREYLIST
# This example shows how one can assign a behavior to multiple hosts at once.
# Note the comments applied to each host in the group in parenthesis. These
# comments will be mapped to those hosts and saved internally. The comments
# on the end of the line, using # signs, are also legal, but will not be
# saved during the import process.
Personal_IPs:
10.1.1.7 (Joe's Computer),           # Joe's computer
10.1.2.255/24 (Tom's Computer)       # Tom's computer
                  ACCEPT { max_message_size=20M }
# This example shows separation with only whitespace (no commas)
Cut_and_Pasted_from_SenderBase:
1.2.3.4
1.2.3.5
1.2.3.7
1.2.3.8
                  $BLACKLIST
# We don't like these people. Uses a predefined behavior.
Blacklisted: 10.1.1.3 (SpamCo), 10.1.1.18 (Spamatron) $BLACKLIST
# This example shows the use of a SenderBase Reputation score...
Looks_Like_Spam:
     sbrs[-10:-7.5] (Catch low reputations)
            $BLACKLIST
# The "ALL" entry must always appear last, and defines the behavior for any
# incoming connection that doesn't match the previous rules.
ALL                $GREYLIST (Rate limit everyone else.)
```

```
$BLACKLIST    REJECT   { smtp_banner_text="You have been blacklisted." }
$WHITELIST    ACCEPT   { max_concurrency = 600,
                         max_message_size = 20M,
                         smtp_banner_code = 220,
                         smtp_banner_text = "Hello there." }
$GREYLIST     ACCEPT   { max_message_size = 5M,
                         max_rcpts_per_hour = 5k,
                         max_rcpts_per_hour_text =
"You have exceeded 5,000 recipients this hour.
If you feel this limit is too low, please contact mailadmin@mycompany.com"
                       }
behaviors =   {'BLACKLIST':
                  ('REJECT', {'smtp_banner_text':'You have been blacklisted.}),
               'WHITELIST':
                  ('ACCEPT', {'max_concurrency':600,
                         'max_message_size':12582912,
                         'smtp_banner_code':220,
                         'smtp_banner_text':'Hello there.' }),
               'GREYLIST':
                  ('ACCEPT', {'max_message_size':5242880,
                         'max_rcpts_per_hour':5120,
                         'max_rcpts_per_hour_text ': 'You have exceeded 5,000
                         recipients
this hour.\nIf you feel this limit is too low, please contact
mailadmin@mycompany.com'}),
               }
```

The mapping of hosts to behaviors can be implemented as an ordered list. Each element of the list is a tuple containing: (1) the label (or None if there is no label), (2) a list of lists of hosts (each nested list is an aggregate), (3) the behavior (either a string, if referring to a behavior definition, or a behavior tuple, as above, if the definition is "inline"), and (4) an entry comment (or None, if there is not comment associated with the entry).

Each host is represented itself as a tuple of three values: the type (e.g., IP address, hostname, or SenderBase organization ID), the host itself (e.g., an IP address, CIDR block, domain name, etc.), and a comment (or None, if there is no associated comment).

The following shows an example set of HAT mappings, followed by the representation of the data structure.

```
Personal_IPS:
   10.1.1.7 (Joe's Computer),        # Joe's computer
   10.1.2.255/24 (Tom's Computer)    # Tom's computer
          ACCEPT { max_message_size=20M }
Blacklisted: .spamco.com (SpamCo), sbo:1234 (Spamatron)
$BLACKLIST (Spammers)
HAT_mappings = [("Personal_IPs",
            [("10.1.1.7", "Joe's Computer"),
             ("10.1.2.255/24", "Tom's Computer")],
            "ACCEPT",
            {"max_message_size":20971520},
            None),
          ("Blacklisted",
            [(".spamco.com", "SpamCo"),
             ("sbo:1234", "Spamatron")],
            "$BLACKLIST",
            "Spammers"),
        ]
```

B. Example RAT

The following is an example RAT.

| | | |
|---|---|---|
| yahoo.com | ACCEPT | |
| example.com | REJECT | smtp_response_code=554 |
| | | smtp_banner_text="Go away." |
| postmaster@ | ACCEPT | smtp_response_code=250 |
| | | smtp_response_text="Postmaster mail accepted." |
| ALL | REJECT | |

For new injectors, default RATs can be established. For example, a new public injector can use "ALL REJECT" while a new private injector can use "ALL ACCEPT."

Generally, the format of the RAT is the same as for the HAT except for the address and access fields.

C. Additional Parameters for Use in the HAT and RAT

The following is a list of parameters that can be used in the HAT and RAT. For each parameter, the list includes the parameter name (which can include letters, digits, and underscores) followed by an "=" sign, and then the value. The value can be a number or a string, and numbers can be followed by the letter "M" which multiplies the number by 1,048,576. Numbers followed by the letter k are multiplied by 1,024. A simple string value is just a sequence of alphanumeric characters (with no spaces). If a more complex string is needed, then it can be enclosed with double quotes. Backslash is the escape character used in a quoted string. Parameters can be continued on the next line as long as there is some whitespace at the beginning of the line. Quoted strings do not need the whitespace, but if it exists, then it will be removed. This syntax is defined in ABNF form (RFC2234).

```
VCHAR            = %x21-7E              ; visible (printing) characters
ALPHA            = %x41-5A | %x61-7A    ; A-Z / a-z
SP               = %x20
HTAB             = %x09                 ; horizontal tab
DIGIT            = %x30-39              ; 0-9
ALNUM            = ALPHA | DIGIT
float            = [- | +]? DIGIT+ ["." DIGIT+]?
space            = SP | HTAB
line_break       = CR | LF | CRLF | comment
WSP              = space | line_break
allowed_policy   = 'ACCEPT' | 'RELAY' | 'CONTINUE'
denied_policy    = 'REJECT' | 'TCPREFUSE'
policy           = allowed_policy | denied_policy
line_label       = [A-Za-z_]+[A-Za-z0-9_-]*
behavior_label   = $[A-Za-z_]+[A-Za-z0-9_-]*
range            = DIGIT{1,3} "-" DIGIT{1,3} ; values from 0 to 255
Snum             = DIGIT{1,3}           ; representing a decimal integer
                                        ; value in the range 0 through 255
ip-addr          = Snum ["." Snum]{3}
ip-block         = Snum ["." Snum]{0,3} ["."]?
ip-range         = [Snum "."]{0,3} range
netsize          = DIGIT{1,2}           ; value in range 0 through 32
ip-cidr          = Snum ["."Snum] {0,3} "/" netsize
sub-domain       = ALNUM [ALNUM | "-" | "_"]* ALNUM
glob-hostname    = ["." sub-domain]+
fqdn             = sub-domain ["." sub-domain]+  ; Note: This is a loose
                                                 ; specification of a fqdn.
senderbase_id    = "sbo:" DIGIT+        ; SenderBase IDs are integers
senderbase_rep   = "sbrs[" space* float space* : space* float space* "]"
host             = ip-addr | ip-block | ip-range |
                   ip-cidr | fqdn | glob-hostname | senderbase_id
host_block       = [host paren_comment? [[',' |WSP] WSP* host
paren_comment?]*]? |
                   'ALL'
definition       = policy [space+ param_block]? WSP* paren_comment? line_break
policy_definition = policy [space+ param_block]? WSP* line_break
rightside        = definition | label WSP* paren_comment? line_break
label_definition = behavior_label WSP+ policy_definition
host_line        = [line_label:]? host_block WSP+ rightside
unit             = 'k' | 'M' | 'G'
Wnumber          = [0-9]+ unit?
quote            = %0x27
dquote           = %0x22
qchar            = %x01-21 | %x23-%x26 | %x28-%x5b | %x5d-%xff
                                        ; Any characters except \, ", and '
string           = Any number of printable characters except quotes, which
                   must be escaped if they match the quotes used to delimit
                   the string. (How to best represent this?)
comment          = WSP* '#' string line_break
paren_comment    = WSP* '(' [%x01-%x28|%x29-%x5b|%x5d-%xff|\\|\)]* ')'
                                        ; Any characters except \ and ), but allow \\ and
                                        ; \) as escape patterns for those characters
squote_string    = quote [qchar | dquote | line_break | escape quote]* quote
dquote_string    = dquote [qchar | quote | line_break | escape dquote]* dquote
quoted_string    = squote_string | dquote_string
option           = 'on' | 'off' | 'require'
numerical_param  = 'max_concurrency' | 'max_message_size' |
                   'max_msgs_per_session' | 'max_rcpts_per_msg' |
                   'smtp_banner_code' | 'rate_limit' |
                   'max_rcpts_per_hour' | 'max_rcpts_per_hour_code' |
                   'netmask'
string_param     = 'smtp_banner_text' | 'max_rcpts_per_hour_text' |
                   'tls' | 'use_sb'
param            = numerical_param space* '=' space* number |
                   string_param space* '=' space* quoted_string
params           = param [[',' | WSP] WSP+ param]*
param_block      = '{' WSP* params WSP* '}'
table            = entry*
entry            = comment | label_definition | host_line
```

D. Aggregated Time-Based Counters

Generally, the first step in managing connections and mail flow is determining what is happening, such as by counting the number of messages received per hour from a sender or the number of connections at a given time from a sender. Once the measurement is made, the system can determine what, if any, actions to take to control the flow of messages to the system.

Any number of attributes or events can be counted. For example, every connection to a MTA from another MTA has a connection event, and every connection event has one or more message events, and every message event has one or more recipient events. In one embodiment, a counter is based on the recipient events. For example, the number of messages for recipients from a sender over a specified time period is determined (e.g., the number of recipients from sender X per hour). This can be useful for dealing with spam, since spammers typically send each message with a large number of recipients, such as 50 recipients per message. Thus, counting recipients instead of messages can be desirable when controlling mail flow to deal with spam.

In another embodiment, a counter is based on the number of connection events. For example, the number of connections currently open to an MTA from a sender is determined. This can also be useful in controlling spam as spammers typically send many messages over many connections.

In yet another embodiment, a counter is based on the number of bounce messages due to invalid email addresses. For example, the number of bounce messages generated due to messages from a sender being addressed to invalid email addresses are counted. This can be useful in preventing directory harvest attacks.

A time based aggregate counter can be used for each parameter of interest, such as the key value for the entries in the HAT. For example, if the HAT includes two entries, 1.2.3.4 and 1.2.3/20, a connection from IP address 1.2.3.4 will start with a counter key of "1.2.3.4," whereas a connection from IP address 1.2.3.4 will start with a counter keyed by "1.2.3/20." In other implementations, multiple counters can be used and incremented if a connection matches on more than one entry.

If a HAT entry lists multiple values for the same behavior, each value can be treated separately. For example, if a HAT entry is for "1.2.3.4, 1.2.3.5," the appropriate key would be either of the two listed IP addresses instead of a string comprised of the whole HAT key entry. If the HAT includes the "ALL" catch-all entry, and the "ALL" entry is matched, the counter key can be initially set to the IP address of the incoming connection.

In addition, other parameters can be used. For example, a "use_sb" option can be used to apply SenderBase logic to the IP address, and the counter key can be modified based on the available SenderBase information. For example, the following rules can be applied:

(1) If the SenderBase organization ID and subdivision mask are received from SenderBase, the subdivision mask can be applied to the IP address to generate a CIDR block, and the counter key is the thus generated CIDR block.
(2) If the SenderBase organization ID is received, but not the subdivision mask, the organization ID can be used as the counter key.
(3) If neither the SenderBase organization ID or subdivision mask are received, a user-supplied netmask can be used by default, and if the user has not specified a netmask, the system can be configured to use a default value of "/24," and the resulting CIDR block is used for the counter key.

If the user has supplied a netmask, but has not chosen to use SenderBase, the user supplied netmask can be applied to the IP address to create a CIDR block that is used as the counter key.

Counters can be stored in a variety of ways, such as through the use of a data dictionary that is keyed off the HAT table criteria that is matched. When an incoming connection is made and the matching HAT criteria is determined, the thread processing the connection looks up a reference to the appropriate counter, which is held by the thread until the end of the connection session, thereby avoiding the need to perform key lookups every time a recipient is processed.

When a reference is retrieved from the data dictionary, the system determines if the counter dictionary is expired (e.g., over an hour old for an hourly based counter). If the counter is expired, a new counter object is returned and the old dictionary is deleted, such that all counters are reset to zero. Thus, the birth time of the data dictionary is set to the most recent hour's beginning. For example, if after a period of inactivity, a connection comes in at 4:15 PM, but the birth time of the dictionary is listed as 3:00 PM, the old dictionary is deleted and the new dictionary is retroactively given a birth date of 4:00 PM.

One or more user options can be used with the techniques herein for controlling message flow. For example, the user can be given the option to turn the use of SenderBase with mail injection control on or off. The MTA can be configured with an appropriate default value, such as that the SenderBase option is set to "on" for a new public injector but set to "off" for a new private injector.

A timeout variable can be used to determine the on/off state for using SenderBase. For example, a timeout of zero can specify that the user has turned off SenderBase support. A timeout of greater than zero specifies that SenderBase support is active, with the timeout value indicating how long the system will wait (e.g., the number of seconds) for a response from SenderBase before giving up. If SenderBase support is "off" or a query to SenderBase fails, the system can be configured to not perform further queries to SenderBase for connections for the injector. If a HAT entry contains an "sbo:" host, that host does not match any incoming connections because the SenderBase Organization ID cannot be determined for the connection. If a HAT entry has the "use_sb" option, the netmask provided by the user for that entry (or "/24" if none) can be used instead, just as if no data if received from SenderBase.

Another possible user option can be to enable a cache time for the SenderBase results. For example, a default time equal to the time to live (TTL) provided by SenderBase can be used, and the user can adjust the value to either zero to preclude caching any results or a non-zero value of the user's choosing, which is used in place of the TTL value from SenderBase.

Actions taken as part of mail flow control can be logged. For example, the actions taken against a connection can record the relevant parameters that supported the action, such as "ICID X from 1.2.3.4 limit N exceeded for HAT entry '1.2.3/24'". As another example, actions taken against an individual recipient can be logged to record the relevant parameters that support the action, such as "ICID X MID Y 'bob@example.com' limit N exceeded for HAT entry '1.2.3/24'".

E. Example GUI for Managing Connections and Email Messages

Figure 5:
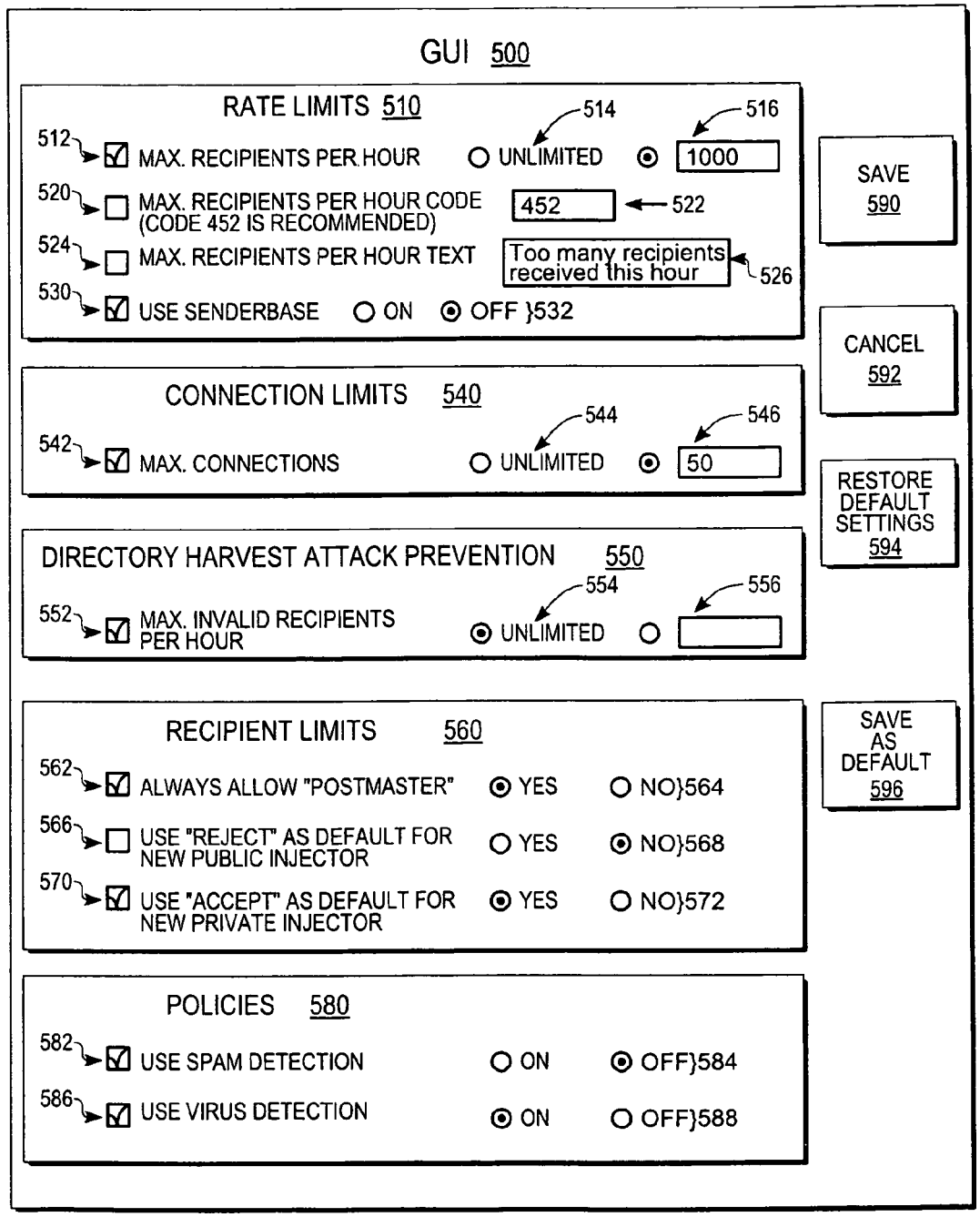
FIG. 5 is a block diagram depicting an example of a graphical user interface for use in managing connections and email messages received by a server, according to an embodiment.

FIG. 5 is a block diagram depicting an example of a graphical user interface (GUI) 500 for use in managing connections and email messages received by a server, according to an embodiment. GUI 500 can be displayed by an MTA, such as server 100 through display 130 to administrator 140. Note that FIG. 5 includes a representative sampling of the types of interface controls for several selected features of the approaches described herein, but in practice, any suitable interface control or widget for any number of the features described herein can be implemented.

GUI 500 includes several graphical widgets that include one or more options for the following features: rate limits 510, connection limits 540, directory harvest attack prevention 550, recipient limits 560, and policies 580. Each of these features is described further below. By selecting the various features and options, server 100 can automatically add or modify one or more rules in the HAT or RAT to implement the desired functionality, as described above. In addition, the HAT and RAT can be configured to be modified directly by a user instead of through the use of a GUI such as GUI 500.

GUI 500 also includes the following set of buttons: save 590, cancel 592, restore default settings 594, and save as default 596. Save 590 is a graphical button that can be selected by a user, such as administrator 140, to save the options and inputs entered by administrator 140 through GUI 500. Cancel 592 exits GUI 500 without saving any changes that may have been made to the options and inputs of GUI 500. Restore default settings 594 restores the options and inputs of GUI 500 to the specified default settings. Save as default 596 saves the current options and inputs as the specified default.

Rate limits 510 includes a checkbox 512 for specifying whether or not the maximum recipients per hour should be limited. If checkbox 512 is checked, the rate at which recipients are accepted is limited by server 100, but if checkbox 512 is not checked, the rate at which recipients are accepted is not limited by server 100. Checkbox 512 is associated with a selection button 514 that specifies the rate to be unlimited and a selection button 516 that specifies the rate to be the value entered in the associated text input box.

Rate limits 510 includes a checkbox 520 for specifying whether or not a maximum recipients per hour code should be used, with the notation illustrated that SMTP code 452 is recommended. Checkbox 520 is associated with a text input box 522 that allows administrator 140 to enter the SMTP code to be sent to the sender of an email message when the email message is rejected because the specified maximum number of recipients per hour is exceed.

Rate limits 510 includes a checkbox 524 for specifying whether or not a text string should be included when email messages are rejected for exceeding the specified injection rate. Checkbox 524 is associated with a text input box 526 that administrator 140 can use to provide a text message to be included with the SMTP response for rejected email messages based on the maximum number of recipients per hour being exceeded.

Rate limits 510 includes a checkbox 530 to specify whether or not SenderBase should be used when applying the rules in the HAT. Checkbox 530 is associated with selection buttons 532 that allow administrator to specify whether the SenderBase option is "on" or "off." For example, if SenderBase is specified to be used by checking checkbox 530 and clicking the "on" button of buttons 532, server 100 will send a query to SenderBase using the incoming IP address of a sender, and then use the information returned by SenderBase for the sender when identifying which rule in the HAT should be applied. While FIG. 5 uses SenderBase, any type of information service can be used instead to provide information about senders.

Connection limits 540 includes a checkbox 542 to specify whether or not the maximum number of connections to the MTA should be limited. Checkbox 542 is associated with a selection button 544 to specify that the maximum number of connections is unlimited and a button 546 to specify the maximum number of connections in the associated text input box.

Directory harvest attack prevention 550 includes a checkbox 552 to specify whether or not the maximum number of invalid recipients per hour should be applied. Checkbox 552 is associated with a selection button 554 to specify that the maximum number of invalid recipients is unlimited and a selection button 556 to specify a maximum number of invalid recipients per hour through the associated text input box.

Recipient limits 560 includes a checkbox 562 to specify whether or not to always allow email messages addressed to the "postmaster" username for the domain or domains served by the MTA. Checkbox 562 is associated with selection buttons 564 that allow administrator 140 to indicate that this option should or should not be used by checking "yes" or "no," respectively.

Recipient limits 560 includes a checkbox 566 to specify whether or not the "reject" action should be used as the default RAT rule for new public injectors. Checkbox 566 is associated with selection buttons 568 that allow administrator 140 to indicate "yes" or "no" for using the "reject" action for new public injectors.

Recipient limits 560 includes a checkbox 570 to specify whether or not the "reject" action should be used as the default RAT rule for new private injectors. Checkbox 570 is associated with selection buttons 572 that allow administrator 140 to indicate "yes" or "no" for using the "reject" action for new private injectors.

Policies 580 includes a checkbox 582 to specify whether or not spam detection is to be used, along with selection buttons 584 that allow administrator 140 to turn spam detection "on" or "off."

Policies 580 includes a checkbox 586 to specify whether or not virus detection is to be used, along with selection buttons 584 that allow administrator 140 to turn virus detection "on" or "off."

F. Collecting and Aggregating Message Information (1) Introduction to Managing Message Information Although some senders inject messages into an MGA that are desirable, many other senders are injecting messages into the MGA that are undesirable, such as spam messages or virus infected messages. An MGA administrator would like to be able to distinguish the flow of messages from different senders, such as IP addresses, domains, CIDR blocks, etc., and to easily see patterns among such observed message flows so that the administrator can control the flow of messages differently depending on who the sender is and what kind of messages are being sent to the MGA.

Techniques are provided for gathering data about the flow of messages: into a system and generating graphical representations of the data to allow a user to identify patterns in the message flows and thereby take action based on the identified pattern. For example, the number of messages being received at an MGA from a particular IP address can be tracked and displayed on a graph that is part of a graphical user interface (GUI). The administrator of the mail server can inspect the graph to identify any patterns or abnormalities, such as a spike in the incoming flow of messages from the IP address. The administrator can then take action, such as throttling the rate at which e-mails are allowed to be received at the email server because of the unusual spike in the number of messages being received, which could indicate that the influx of emails are unsolicited commercial emails, such as spam.

The administrator takes the action by clicking on a button in the GUI, such as a "BLACKLIST" button or a "THROTTLE" button, that when selected by the administrator causes the email server to modify the server's configuration information to add the IP address to a blacklist or merely to be rate limited, respectively, that identifies IP addresses from which messages are to be controlled by either not accepting additional messages or by limiting the rate at which messages are accepted from the sender (e.g., by adding to or modifying the HAT). If an unusual mail flow pattern is desirable, such as a spike being caused at a large company when an outside contractor is sending all of the company's employees copies of a press release, the administrator can click on a "WHITELIST" button to allow all such messages to be accepted, thereby avoiding such messages from inadvertently being treated as spam.

In addition, approaches are described that track the application of policies to the flow of messages, such as actions specified in the HAT or RAT, by sender identifiers and generate reports based on the results. For example, the mail flow monitoring system can present the user with a graphical representation of the mail flow over time for one or more sender identifiers or for all mail flow into the system, along with a breakdown of how many of the messages were blacklisted, whitelisted, greylisted (e.g., subject to injection control), or other categories of treatment or lack thereof.

Mail flow monitoring functions can include a number of items. For example, detailed information can be provided about incoming messages, outgoing messages, and processing statistics. Other sources can be accessed for data, such as SenderBase that supplies network owner names and global information for a sender profile. Data can be aggregated and tabular results presented by grouping data on IP address, domain, network owner, or any other sender identifier, along with time series data by the same groupings.

Mail flow monitoring can be implemented in a hierarchical fashion, such as a low level that interacts with a data store or real time data inputs, a middle level that composes tables and aggregates, and a high level interface that finalizes the data for presentation via a graphical user interface.

(2) Collecting Data on Message Flows

Mail flow data can be collected by measuring inbound and outbound traffic flows, including bytes, recipients, messages, connections, success conditions, failure conditions, and actions taken, such as those specified in the HAT and the RAT. Typically, such measurements are collected by IP address over short time intervals (e.g., one minute intervals). The per measurement interval counters are aggregated over time to represent traffic over longer time intervals and over IP addresses to represent traffic and product reports by domain name, IP address, subnet, a range of IP addresses, a fully qualified domain name, any level domain, a CIDR block or portion of a CIDR block, a SenderBase organization ID or a SenderBase reputation score.

In one embodiment, a queue is used to collect data on message flows. For example, collecting data in real time as part of processing incoming messages can at time affect performance to an unacceptable degree, based on the user's needs. By using a queue into which information for each connection and/or message is placed, the data can be processed outside of the normal message processing, thereby avoiding processing impact from the data collection process. However, the delay in placing information into the queue and the offline processing of the queue is not great, typically on the order of seconds or a minute or two, and thus the data is generated and can be displayed and reported substantially in real time as the data is collected an processed.

As a specific example, the processing of the data in the queue can perform an aggregation of the information in periodic intervals, such as one minute snapshots. The aggregated data from the single minute snapshots can then be further aggregated over longer periods, such as to provide hourly summaries or daily reports. Any level of data, from the lowest level information from the smallest aggregation interval to all data collected, can be reported and displayed to the user.

Mail flow data can also be aggregated, displayed, and reported based on the concept of a "primary domain." For example, yahoo.com, aol.com and honda.co.jp are examples of primary domains that are affiliated with a particular organization, such as Yahoo!, America Online, and Honda of Japan, respectively. By associating individual IP addresses that connect to the system with the corresponding domain name, mail flow data that is collected based on IP addresses can be aggregated based on the associated primary domains that based on some or all of the IP addresses associated with the primary domain.

In addition, data can be aggregated, displayed, and reported based on the network owners for individual IP addresses based on a database that includes a mapping of IP addresses to network owners, such as the SenderBase service. For example, when a connection is received from an IP address at the MGA, the system can issue a query to SenderBase to obtain the information for the IP address, such as the network owner, SenderBase organization ID, and perhaps even a reputation score. As a result, a network owner that has a many IP addresses that are not otherwise organized in a manner that would allow for the IP addresses to be tacked back to the network owner without the user of such a database can have all of the network owner's IP addresses grouped together, and the system can aggregate, report, and display data for the network owner based on some or all of the IP addresses associated with the network owner.

(3) Types of Counters for Collecting Data

Any of a number of different counters can be used for collecting data about the flow of messages through the system, and the counters can be based on any kind of sender identifier, such as those described herein. For example, counters can be used to track the actions taken based on rules in the HAT and RAT, such as a counter for the number of recipients that are blocked from a sending IP address based on injection control or the number of connections refused from a domain due to the maximum number of connections being exceeded. As another example, counters can track the number of messages identified by the system as spam, such as by the Brightmail anti-spam engine, or the number of messages determined to be infected with a virus, such as by Sophos anti-virus engine.

Counters can be established for different actions taken based on sender identifiers. For example, one counter can track the number of messages rejected for a CIDR block that is listed for a rule in the HAT, while another counter can track the number of messages rejected for a specified domain name that is listed in the HAT. In general, a counter can be used for any sender identifier listed on the left side of the HAT and RAT and count the number of messages affected by the action or rule specified on the right side of the HAT and RAT.

(4) Reporting and Displaying Data on Message Flows

A graph can display the number of recipients injected over the last day, along with the result of the connection attempts by connection policy (e.g., accepted, throttled, relayed, or blocked/rejected) over the same day. In addition, a mail flow summary can be provided that shows the total overall mail flow statistics as well as a breakdown by domain or other sender identifier. Furthermore, the display of the mail flow information via the GUI can include other functions, such as a quick search function that allows the user to specify an IP address for which the system generates a graphical display and/or report of mail flow information based on the specified search criteria. Finally, the display, can include a quick report function to generate a report based, such as the top IP addresses by the number of recipients blocked.

Figure 6:
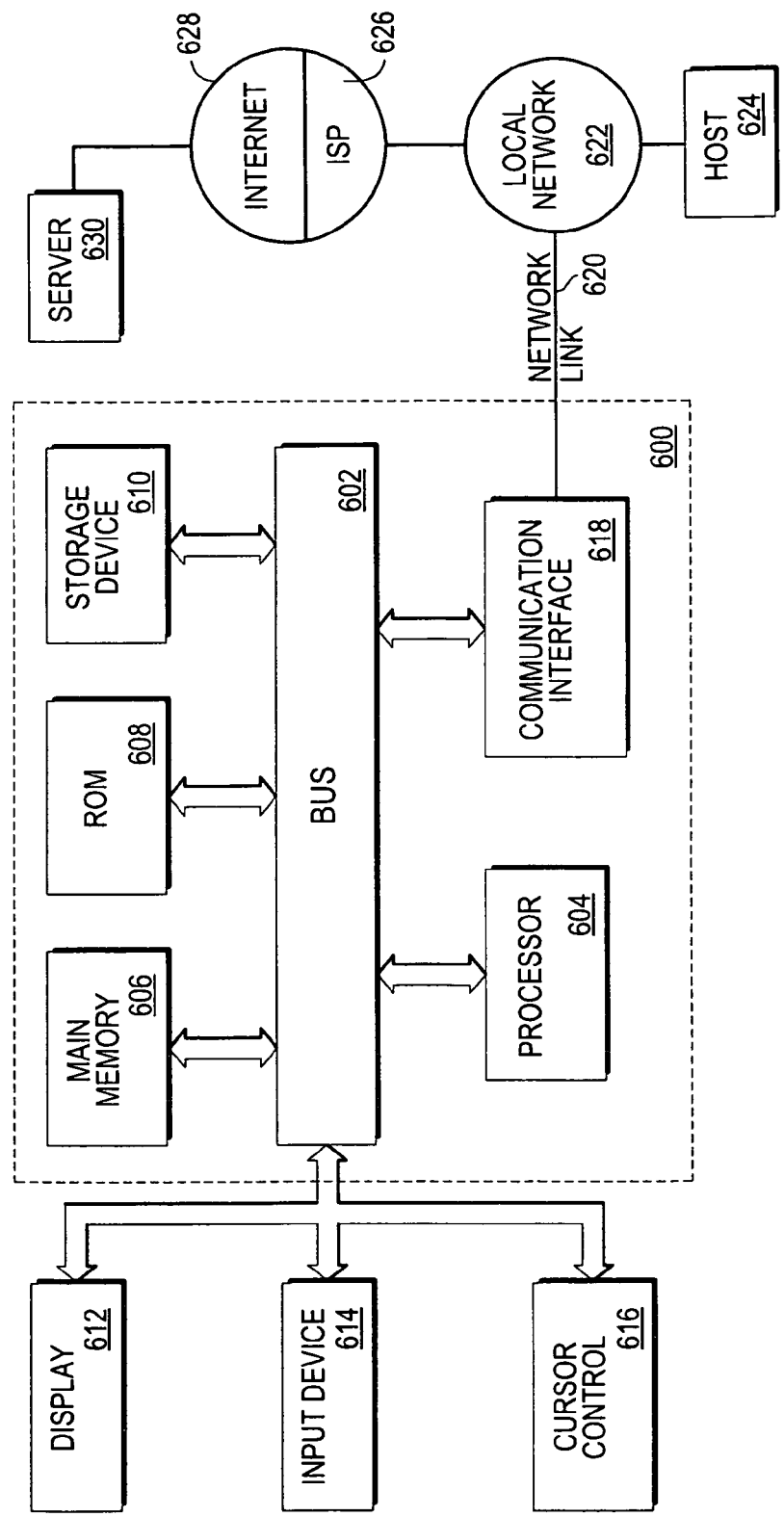
FIG. 6 is a block diagram that depicts a computer system upon which embodiments of the invention may be implemented.

As another example, a current mail flow graph can display the total rate at which recipients are being injected into the MGA, along with how many of the injected recipients are being blocked as spam, such as by using Brightmail, and how many of the injected recipients are being blocked based on a reputation filter, such as by comparing reputation scores, such as from SenderBase, for the senders of the messages to a specified limit. Also, a summary of the breakdown of the treatment of the recipients can be displayed, such as the percentage of recipients that have been blocked due to a blacklist, those that are allowed based on a whitelist, those that have been subject to injection control (e.g., throttling, or greylisted), and those whose disposition is otherwise unknown or not included in the other categories. In addition, the display of the mail flow information via the GUI can include other functions, such as a quick search function that allows the user to specify an IP address or sender type for which the system generates a graphical display and/or report of mail flow information based on the specified search criteria. Finally, the display, as illustrated in FIG. 6, can include a quick report function to generate a report based on a sender identifier based on one or more search criteria.

(5) Identifying Patterns

The use of a GUI for displaying mail flow data, such as in the forms of graphs and tables, allows the user to identify patterns, such as that a virus attack is underway or a spam campaign has targeted the recipients for the MGA. For example, a mail flow graph can depict a large increase in the number of recipients blocked based on the reputation filter during Friday and Saturday. The user can then request a report on the IP addresses from which the reputation filter blocked messages were received, and then add some or all of the IP addresses thereby identified to the HAT with an appropriate rule, such as that the IP address is to be blacklisted or subject to mail injection rate limitations.

(6) Alerts and Alarms

In some implementations, the mail flow monitoring portion of the system can compare mail flow data to thresholds, limits, or other specified values, and generate an alert message to the administrator of the MGA or present an alarm message on a display. For example, the system can compute a thirty day average, such as that the MGA is having 100 recipients/day injected from a particular IP address. The system can then compare the mail flow from the particular IP address for the current day to the thirty day average. If the difference between the data for the current day and the thirty day average exceeds a specified amount, such as a threshold level of a 500% increase, the system can send an alert message to one or more individuals associated with the MGA and/or display an alarm message on a display associated with the MGA. The alert or alarm allows the user of the MGA to review the mail flow data and take an action. For example, a 500% increase in the number of injected recipients from a particular IP address may indicate a hit and run type of spam campaign, and as a result, the user can take an appropriate action, such as using mail flow injection control to limit the number of recipients being injected to the MGA to a particular amount, such as the thirty day average, or such as blacklisting the IP address for the next several hours.

(7) Taking Actions

In some implementations, the system for displaying mail flow monitoring data includes one or more graphical objects, such as buttons, that allow the user to take actions based on the information being displayed. For example, if the display includes a mail flow graph that depicts the number of messages being received over that last six hours from an IP address and that shows an unusually large spike in the number of messages received over the last thirty minutes, the user can click on one or more buttons that cause the system to take a specified action. As a specific example, if the user determines that the spike is likely the result of a virus attack or a hit and run spammer, the user can click on a button on the display labeled "BLACKLIST" to have the IP address showing the spike in messages blacklisted. Such a capability can be referred to as a "one button blacklist" feature, and can be implemented by making a change to the HAT.

As another specific example, the user can click on a button labeled "WHITELIST" to have the messages allowed, such as when the user determines the IP address is that of a trusted partner who is unlikely to be the source of virus infected messages or spam. As yet another example, the user can click on a button labeled "GREYLIST" to have the flow of messages from the IP address limited, such as by employing one of the mail injection control approaches described herein to limit the rate at which recipients are injected to the MGA by the IP address.

The system can implement the action represented by the user's use of such graphical objects, such as the buttons described above, by one of a number of approaches. For example, when a button is clicked by the user, the system can generate an appropriate rule and add the rule to the HAT or RAT, such as that the identified IP address be blacklisted, whitelisted, or greylisted.

G. Managing Information Relating to Senders of Electronic Messages (1) Overview

This section describes approaches and techniques for collecting, aggregating, and managing information relating to the senders of electronic messages. In one aspect, the techniques include obtaining a first set of data from a first source and related to one or more message senders each sending one or more electronic messages, obtaining a second set of data from a second source and related to the one or more message senders each sending one or more electronic messages, determining message volume information related to the one or more message senders based on the first set of data and the second set of data, and providing the message volume information related to the one or more message senders.

In another aspect, the approaches include receiving one or more messages from a particular message sender, sending a request for message volume information related to the particular message sender, receiving the message volume information related to the particular message sender, where the message volume information related to the particular message sender was determined by obtaining a first set of data from a first source and related to one or more message senders each sending one or more electronic messages, obtaining a second set of data from a second source and related to the one or more message senders each sending one or more electronic messages, determining message volume information related to the one or more message senders based on the first set of data and the second set of data, and limiting delivery of messages from the particular message sender based on the message volume information related to the particular message sender.

In another aspect, the approaches include receiving one or more messages from a particular message sender, sending a request for message volume information related to the particular message sender, receiving the message volume information related to the particular message sender, where the message volume information related to the particular message sender was determined by obtaining a first set of data from a first source and related to one or more message senders each sending one or more electronic messages, obtaining a second set of data from a second source and related to the one or more message senders each sending one or more electronic messages, determining message volume information related to the one or more message senders based on the first set of data and the second set of data, and blocking delivery of a particular message from the particular message sender based on the message volume information related to the particular message sender.

(2) Example Information about an Email Sender

Example information that a data processing unit may collect for message senders are: time of the first request for information about that email sender, volume over time of requests for information about that email sender, percentage of total volume of all requests for information about that email sender, network owner of the IP address from which the message is sent, network topology information for the area of the network in which the IP address of the email sender is located, category of enterprise or organization to which the email sender belongs, time that the IP address of the sender last changed ownership, geographical location of the email sender, geographical information about the path the email message has taken, or any other appropriate information.

The time of the first request for information about a particular email sender may be obtained by keeping information related to each request for information for each sender about which information is requested. Whenever information is requested for a sender, a record or set of records related to the request for information may be recorded or modified. For example, if no information for that sender has been recorded previously, then a new record or set of records is created and the time of the first request is recorded.

A data processing unit collects the volume over time of requests for information about an email sender or group of senders. The calculation of volume over time may be performed in any appropriate manner and for any appropriate time periods. For example, the volume over time may be calculated as the number of requests for information about a particular sender or group of senders over a day, week, month, 30-day period, or year. As another example, the volume over time is calculated as a percentage as follows:

Percent volume over time $T$=(number of information requests for a particular sender or group of senders for time $T$)/(total number of information requests for all senders for time $T$)

Alternatively, the volume over time may be calculated as an estimate of total number of messages a particular sender or group of senders has sent on the entire Internet as follows:

Estimated Total Number of Messages over Time $T$=Estimated Total Number of Messages on Internet over time $T$*Percent volume over time $T$ Alternatively, the volume over time may be calculated logarithmically to provide a magnitude value as follows:

Magnitude value for time $T$=10+$\log_{10}$ (Percent volume over time $T$)

Another example of a volume over time calculation is the fluctuation in volume over time. For example, one or more of the following can be used: determine the fluctuation in volume over time as a percentage or absolute change in any appropriate volume calculation over time T1 as compared to time T2, where T2<T2; determine a percentage or absolute change in any appropriate volume calculation over time T1 as compared to time T2, where T1 and T2 do not overlap; determine a percentage or absolute change in any appropriate volume calculation over time T1 as compared to time T2, where T1<T2 and T2 represents the entire time range for which information about a sender or group of senders has been collected; or any other appropriate calculation.

A data processing unit determines the network owner associated with a message sender based on the IP address from which the message is sent. Also, a network owner can be determined by geographical location, domain name, or any other appropriate identifier associated with the sender. In other implementations, a network owner is determined by querying a list or data structure of known network owners of IP addresses, or a determination of network owner may be based on domain name, geographical location, or any appropriate information.

Network owners are typically broken up into one or more groups, herein called network operators. For example, an Internet Service Provider (ISP) may be listed as the network owner for a large block of IP addresses. In such an example, the network operators of portions of the IP addresses owned by the network owner (the ISP) may be used by an email gateway or other server or application to indicate blocking a message, bouncing a message, throttling messages from a sender or group of senders, or displaying the information based on the network owner or network operator.

The network operators of IP addresses within a set of IP addresses owned by a single network owner are estimated by assigning separate blocks of IP addresses to separate operators, receiving information from the network owner indicating which IP addresses are operated by which network operators, or estimating network operators based on domain names associated with the IP addresses. For example, an ISP is a network owner and owns a block of IP addresses at "152.2.*.*". In such an example, the block of P addresses may be broken up into blocks of 256 IP addresses: "152.2.1.*", "152.2.2.*", . . . , "152.2.256.*"

The decision whether to break up a network owner may be based on the number of IP addresses owned by the network owner or by the category of the ISP. For example, if an ISP owns 1024 IP addresses, it may be useful to divide the 1024 IP addresses into four sets of 256 IP addresses and assign a network operator to each. In such an example, any blocking, throttling, or other action taken based on the network operator will not effect all of the potential message senders with IP addresses owned by the ISP, but will effect only a portion of the senders. As another example, an email-marketing firm that owns 1024 IP addresses may not have its 1024 IP addresses divided into multiple network operators. In such an example, any and all messages may be considered to come from the same company and should be, if appropriate, blocked, throttled, or any appropriate action taken. Assigning a network operator to a set of IP addresses comprises assigning a new network owner corresponding to the network operator for the set of IP addresses.

The data processing unit obtains network topology information for the area of the network in which the IP address of the email sender is located. In some implementations, network topology information that is associated with a particular sender includes network owners of IP addresses near the IP address of the particular sender, network owners of other IP addresses associated with the same geographical area, or any appropriate network topology information. For example, a particular sender has a particular IP address. If that IP address is near one or more other IP addresses that are suspected spam senders, then the IP address may be rated as more likely to produce spam. As a specific example, an IP address is near another if the two IP addresses have the same high-order significant bits, where the number of bits that are high-order significant bits may be any number of bits, including from 1 bit to 31 bits.

The data processing unit obtains the category of the enterprise or organization associated with the email sender. For example, the categories associated with email message senders can be airlines, Fortune 500 companies, Fortune 1000 companies, Fortune 1500 companies, ISPs, banks, or any appropriate category.

The data processing unit records the change of ownership of an IP address. In some implementations, the change of ownership is recorded by clearing previous information about the IP address or indicating that the owner of the IP address is unknown. Information that may be cleared about the IP address or other indicator may include the first recorded request about a message, volume of requests, or any other appropriate information. In one embodiment, the information request handler keeps track of the number of times that an IP address changes owners. The information about change of ownership combined with other information, such as message volume information, may be used to indicate that a sender may be sending spam.

The data processing unit records geographical location of the email sender. For example, the geographical location of the email sender is determined by the IP address, domain name, or a look up table indicating the geographical location of the email sender. Geographical information may be useful in determining which messages are valid. As another example, if a particular email recipient never receives email from China, then a message from China may be more likely to be spam.

The data processing unit obtains geographical information about the path the email message has traveled, or the geographical path, based on the header information in the email message. The header information in the email message may indicate a path the email message has taken since it was sent. Geographical information may be determined based on the header information in any appropriate manner, including determined by the IP address, domain name, or other look up table indicating the geographical location of gateways the email message has traversed.

The techniques described herein are in no way limited to using the types of information that are described herein. Any appropriate type of information related to the email sender, email messages, or email recipient may be used. For example, information related to email messages may include information in the content of the message, such as the existence of keywords or tokens. An example of email recipient information may be the amount of spam a particular email recipient receives. For example, if 90% of the email that a particular email recipient receives is spam, then that information may be used to aid in the estimation of whether an email directed to that recipient is spam.

(3) Example Process for Managing Information Related to Electronic Messages

The following is an example of a process for collecting, processing, and making available information related to electronic messages.

First, data related to information about email senders is obtained. Various types of data that may be obtained from the following: an email gateway, an information request handler, an email client, or any other appropriate source. As a specific example, data is obtained by requesting the information from the information source. Alternatively, the information source may provide the information based on any appropriate event or based on any appropriate schedule instead of being provided in response to a request. The data may also be obtained by performing a DNS zone transfer. Additionally, multiple sets of data for one or more email senders may be obtained from multiple sources or from the same source at two or more different times.

Next, the data related to information about email senders is processed. For example, multiple sets of data related to email senders obtained from multiple sources or obtained from the same source at different times may be taken in aggregate and processed. As another example, processing the data includes determining one or more of the following: a volume of messages over time, the percentage of message sent by a message sender compared to all messages sent, a magnitude value, a change of absolute or percentage of total messages of a particular time period as compared to a different time period, a change of absolute or percentage of total messages during a particular time period as compared to absolute or percentage of total messages since the first request for information about the sender was received, or any other appropriate calculation. As another example, a data processing unit calculates a magnitude value for a particular network owner associated with a particular message sender and determines the change in the magnitude value as compared to the magnitude value for the previous day.

In some implementations, processing information related to a message sender includes storing information related to the message sender in a database, flat file, or other storage mechanism. For example, processing information related to a message sender includes determining the network owner or network operator associated with the message sender. As another example, the IP address, domain name, geographical location, or network topology of the message sender is used to determine the network owner or network operator associated with the message sender. The decision whether to associate a network owner or network operator with a message sender is based on whether the IP address or domain name of the message sender is in a set of IP addresses or domain names associated with the network owner or network operator.

The determination of which network operator to associate with a message sender is made by dividing the set of IP addresses for a network owner associated with a message sender into two or more network operators and determining which network operator to associate with a message sender based on which network operator is associated with a set of IP addresses containing the IP address of the message sender. A network owner is divided into network operators based on the category of the network owner, based on the number of IP addresses associated with the network owner, based on information about one or more network operators within the network operator, or any other appropriate decision. For example, a message sender is associated with an IP address, which is associated with a particular network owner. The particular network owner is an ISP that owns 1024 IP addresses. The network owner is split into four network operators, each corresponding to 256 IP addresses. The message sender's IP address fall into the range associated with a particular network operator, and the message sender is associated with the particular network operator.

Processing the data related to information about email senders includes determining or storing category information for network owners and network operators. Determining the category information for network owners or network operators may include receiving the category information through a GUI, via an electronic interface, or from an email gateway, information request handler, email client, or any appropriate source. Alternatively, the category information may be determined automatically using an automatic categorizer based on keyword detection, Naïve Bayes, or any other appropriate categorization mechanism. Determining the category information includes accessing a list containing category information and cross-referencing it to message senders, network owners, or network operators. The category information includes a list of airlines, Fortune 500 companies, Fortune 1000 companies, Fortune 1500 companies, ISP's, or any other appropriate category.

Processing the data related to information about email senders includes determining information related to the history of an IP address associated with the message sender. The information about the history of the of the IP address includes determining when a first request for information was made about the message sender, how many requests have been made about the sender, how many requests over time have been made about the sender, how often the IP address has changed network owners, when the IP address last changed ownership, and any other appropriate information. For example, a data processing unit processes data related to an IP address' history in order to determine and store when a request for information about the email sender was first made.

Processing the data related to information about email senders includes determining geographical information. An external electronic service is queried to determine the geographical location of a message sender. The geographical location of a message sender is determined by looking up the location of the IP address associated with the message sender in a lookup table or by querying an electronic service, and then the geographical path of a message is determined. The geographical locations of hubs, routers, or gateways through which the email traveled are determined. The information about hubs, routers, or gateways through which the email traveled is determined by parsing the message header. For example, a data processing unit parses the header of a message from a message sender in order to determine the geographical location of all hubs, routers, and gateways through which the email has traveled.

Next, information related to email senders is made available. The information is made available via a graphical user interface or an electronic interface, and the information is made available by responding to requests for information about message senders, by sending it to an interested party based on particular rules, or by making the data available in a public or private website.

The graphical user interface, by which the information related to email senders is made available, can be from a web site, a graphical interface to a computer program, or any other appropriate graphical interface. Single items or multiple data items as described herein are presented in the graphical user interface.

The information related to email senders may also be made available via an electronic interface. For example, the electronic interface is a DNS-like interface. Alternatively, any appropriate electronic interface may be used, including a web service, a rsync gateway, a FTP server, a HTTP server, a HTTPS server, a defined remote procedure call interface, a TCP/IP sockets interface, a UDP interface, or any other appropriate interface.

H. Determining a Reputation Score for a Sender

In some implementations, a reputation of a message sender is determined by obtaining two or more lists from two or more list providers, then determining which lists of the two or more lists indicate the message sender, and then determining a reputation score for the message sender based on which lists of the two or more lists indicate the message sender.

In addition, an indication can be provided that a message is unsolicited based on a reputation score. Also, information from the two or more lists can be stored in an aggregate list data structure, and determining what lists indicate the message sender includes querying the aggregate list data structure. In a related feature, a particular list is one of the two or more lists and the particular list contains one or more entries, and storing information from the two or more lists in the aggregate list data structure includes determining the difference of the particular list with a previous version of the particular list, storing entries of the particular list that were not in the previous version of the particular list in the aggregate list data structure, and removing from the aggregate list data structure entries that are not in the particular list but were in the previous version of the particular list.

In yet another related feature, determining the reputation score includes determining an individual score for each list of the two or more lists and determining an output score based on the individual score for each list in the two or more lists. Also, determining the output score includes determining an aggregate score based on the individual score for each list of the two or more lists, determining a normalized score based on the aggregate score, and determining the output score based on the normalized score.

In some implementations, the individual score for each list in the two or more lists each includes an individual probability and a list of probabilities includes the individual probability for each list in the two or more lists, and determining the aggregate score based on the individual score for each list of the two or more lists includes performing a Chi Squared calculation on the list of probabilities. In related features, the approach includes one or more of the following: receiving a request for the reputation of the message sender; receiving the request for the reputation of the message sender by receiving a request formatted as a DNS request; the message sender is associated with a particular IP address; determining what lists of the two or more lists indicate the message sender includes determining for a particular list of the two or more lists whether the particular IP address of the message sender is contained in an IP address range indicated by the particular list; and if a particular list indicates an IP address range, setting a bit corresponding to the particular list in a particular list bit mask data structure corresponding to the IP address range.

In some implementations, setting the bit corresponding to the particular list is performed for each list of the two or more lists, and the sender corresponds to a particular IP address, the particular IP address is contained within a first IP address range that has associated with it a first list bit mask, and the IP address is contained within a second IP address range associated with a second list bit mask. In addition, determining which lists of the two or more lists indicate the message sender can be accomplished by performing an "or" operation on the first list bit mask and second list bit mask to produce a third list bit mask and determining what bits are set in the third list bit mask.

Some implementations can include receiving a message from a message sender, obtaining a reputation score of the message sender, where the reputation score of the message sender was determined by obtaining two or more lists from two or more list providers, determining which lists of the two or more lists indicate the message sender, determining the reputation score for the message sender based on which lists of the two or more lists indicate the message sender, and if the reputation score is worse than a first predefined threshold, indicating that the message is unsolicited.

Related features include one or more of the following: if the reputation score is better than a second predefined threshold, an indication is made that the message is valid, where the first predefined threshold is different from the second predefined threshold; if the reputation score is better than the first predefined threshold and worse than the second predefined threshold, indicating that the message is not estimated as either valid or invalid; sending a request for the reputation score of the message sender; obtaining the reputation score of the message sender by receiving a response to the request for the reputation score of the message sender; and sending the request for the reputation score of the message sender includes sending a particular request formatted as a DNS request.

The following example for determining a reputation score is described assuming that the sender is associated with an IP address. The techniques described herein, however, are in no way limited to use of IP address as an identifier of a sender. In other embodiments, the sender is identified by domain name, email address, geographical location, or any appropriate mechanism.

First, a score is obtained corresponding to each list. For example, this score is obtained by determining, for each blacklist, whether the sender's IP address is in the particular list. If the IP address is indicated in the particular list, then the score for the list represents a certain percentage likelihood that the message is an unsolicited electronic message (often higher than 50%). If the IP address is not indicated in the particular list, then the score for the list still represents a certain percentage likelihood that the message is an unsolicited message (often less than 50%).

In another example, this score is obtained by determining, for each "white" list, whether the sender's IP address is in the particular list. A white list is a list of IP addresses and ranges that are believed to be associated with senders of legitimate electronic messages. If the IP address is indicated in the particular list, then the score for the list represents a certain percentage likelihood that the message is unsolicited (often less than 50%). If the IP address is not indicated in the particular list, then the score for the list represents a certain percentage likelihood that the message is unsolicited (often higher than 50%).

In other examples, a white list or blacklist will contain ranges of IP addresses and exceptions to those IP addresses, thereby including all IP addresses in a range except those that are excluded. The white lists and blacklists contain integer or floating point values indicating scores for IP address ranges and IP addresses, and these scores are used to determine an aggregate score for an IP address with respect to the lists. Also, an aggregate list data structure is queried to determine which lists indicate the sender.

Next, an aggregate score is generated based on the scores for each list determined above. For example, the score for each list is a percentage likelihood that a message is unsolicited and the aggregate score is an aggregate percentage likelihood that is generated based on the individual percentages likelihoods. As another example, this aggregate percentage likelihood is based on a weighted average of the individual percentages likelihoods, a sum or product of the individual percentages likelihoods, a polynomial of the individual percentages likelihoods, or any appropriate calculation. As yet another example, the aggregate percentage is based in part on the Chi Squared function over the probabilities, a Robinson calculation, a Bayes calculation, or any other appropriate mechanism. As a specific example, the Chi Squared function is depicted in the Python Programming Language (www.python.org) code.

Next, the aggregate score is mapped to a normalized score. For example, the aggregate score is an aggregate percentage, and the normalized score is a mapped percentage that has the range from 0% to 100%, and this step is performed by mapping the aggregate percentage to the normalized range from 0% to 100%. As another example, this mapping is linear, piecewise linear, cubic, polynomial, or uses any other appropriate function. As a specific example, a piecewise linear method of mapping the aggregate function is used and comprises determining the known lowest possible probability (LP), the known average probability (AP), the known highest possible probability (HP), and linearly mapping percentages from LP to AP to 0% to 50% and percentages from AP to HP to 50% to 100%. In equation form, with aggregate probability represented as P, this can be represented as follows:

Mapped Percentage (MP)={if $(P<AP)$; $(P-LP)*50/(AP-LP)$ {else; $(P-AP)*50/(HP-AP)+50$.

For example, if LP is 30%, AP is 40% and HP is 80%, then percentages from 30% to 40% would map to 0% to 50% and percentages from 40% to 80% would map to 50% to 100%. In such an example, 35% would map to 25% and 60% would map to 75%.

In related examples, LP is determined by performing the calculations of the previous step using the lowest possible score (e.g. percentage) for each of the lists, and HP is determined by performing the calculations of the previous step using the highest possible score (e.g. percentage) for each of the lists, and AP is determined by performing the calculations of the previous step using a random sample of possible values and averaging the result.

Next, the normalized score is mapped to an output score. In one embodiment, a mapped percentage is mapped to an output (mapped) score. In various embodiments, this mapping is linear, piecewise liner, cubic, piecewise cubic, polynomial, or piecewise polynomial, exponential, piecewise exponential, or any appropriate mapping. In one embodiment, this mapping is performed by using a piecewise function such as:

Mapped Score (MS)={if MP<0.5; $(-\log(MP)/\log(2)-1)/lo\_k$ {else; $1.0/hi\_k*(1-1/\log(2)*(\log(1/(1-MP)))$, where lo_k and hi_k are constants. It may be beneficial to use hi_k and lo_k values approximately in the range of 0.5 and 2.0. It may be beneficial to use hi_k and lo_k values approximately in the range of 0.6 and 1.0. Hi_k and lo_k may each have the same value or may have different values.

These examples of determining a reputation score for an electronic message sender are based on which lists indicate the IP address of the sender. A result of this example is the determination of a composite score for the sender of the email messages.

I. Controlling Mail Injection

The most basic approach to controlling the injection of mail to a system from a sender is to either allow all messages from the sender or to reject all messages from the sender. Such an "all or nothing" approach is simple and easy to implement, but it may not be appropriate in all situations, and thus, it is desirable to have the ability to define a "grey" area between allowing everything and allowing nothing such that some messages will always be allowed, but at a certain point, messages will be rejected or limited. Allowing some but not all messages may be referred to as injection control because the rate at which senders can send or "inject" email messages to an MTA is limited or controlled. Other equivalent terminology includes "throttling" the flow of messages because some but not all messages are allowed in a given time, and thus the overall rate at which email messages are being accepted by the MTA from the sender is being limited or throttled to a specified rate.

The ability to throttle mail injection, or to control the rate at which one or more senders can send messages to a recipient domain, can be useful for a number of reasons. For example, a high injection rate can be indicative of spam, which is generally undesirable. As a specific example, if a company with a mail gateway device that normally receives a few hundred email messages per hour suddenly begins to receive over a thousand message each hour from a particular IP domain, it is likely that the email messages are part of a spam campaign from the IP domain.

As another example, a large influx of otherwise desired messages over a short period of time can cause problems for the recipient domain, including crashing the recipient domains mail servers. As a specific example, if a large company works with an outside contractor to send press releases, copies of which are to be sent to all the employees of the large company, the mail servers at the large company could experience stability problems due to the large number of messages being sent in a short period of time. Since the large company wishes to have each employee receive the press release, but the large company also wants to avoid stability problems with its mail servers, the ability to control and limit the rate that the messages containing the press release are received can be beneficial.

The threshold point at which a sender, or a remote injector, of email messages is to be controlled depends on the particular implementation and can be configured by the user of the system, such as the administrator of an MTA, although a default value can also be used even if the user has not specified a value. For example, a sender injecting 200 messages/hour may be indicative of a spammer at a small company having only 50 employees, but for a large company with 10,000 employees, such an injection rate may be perfectly normal for mail from non-spam sources.

Once the threshold limit is reached on the rate that a sender is injecting messages, one of a number of approaches can be taken to limit the rate at which subsequent messages are injected. For example, the injection of the messages can be artificially slowed over each connection. However, a spammer can circumvent this approach by opening more connections, although as described herein, the number of connections can also be limited. As another example, the recipients can be rejected by the recipient domain, such as be sending a 452 SMTP error code that indicates that the sender has injected too many recipients. This allows the system to continue to count recipients, which can be done after the message is accepted but prior to forwarding the message to the recipient. As additional examples, TCP_REFUSE or accept_then_close can be used instead of sending a 4xx SMTP error code (e.g., a polite refusal, in contrast to the less polite TCP_REFUSE or accept_then_close approaches).

Mail injection can be controlled based on one or more rules, such as one or more entries in the HAT. As data is accumulated via the counters, that measured data is compared to the parameters in the HAT to determine if any actions are to be taken. It is possible that more than one action will apply to a particular situation. For example, a HAT entry may exist specifically for IP address 1.2.3.4, plus another entry for the CIDR block of 1.2.3/24, both of which would apply to a connection from IP address 1.2.3.4. As a result, the system determines which of the two entries to apply. In some implementations, the HAT is order specific such that the first entry in the HAT that matches to the connection is used. Thus, if the entry for CIDR block 1.2.3/24 is listed before the entry for IP address 1.2.3.4, the action for the entry for CIDR block 1.2.3/24 is used. In other implementations, each entry in the HAT includes a priority identifier, and the entry with the highest priority identifier is used.

Any of a number of attributes can be matched in the HAT, including but not limited to, one or more of the following: a network address, an IP address, an IP address range, a CIDR block, an exact FQDN match, a partial FQDN match, and a SenderBase organization ID. As a catch-all or default entry, a default value, such as "ALL," can be used for controlling the injection rate when no other HAT entry matches, and thus the "ALL" entry can catch senders that are otherwise unclassified (e.g., not matched by any other HAT entries).

For limiting injection and providing injection control, the HAT can include a parameter that specifies the maximum number of recipients in a particular time period, such as the maximum number of recipients per hour (e.g., max_rcpts_per_hour). For example, once the specified limit is reached, the system does not accept any more recipients for the remainder of the time period (e.g., until the end of the hour for an hour-based counter). The HAT can also include a parameter (e.g., max_rcpts_per_hour_text) for the user to specify a custom SMTP response message to be used if a recipient is rejected due to such a rate limitation, as well as the SMTP code that should be returned (e.g., max_rcpts_per_hour_code for which the default can be set to SMTP code 452). The system can be configured to use a default text response if the user does not specify a custom response. For example, the default text response can be "Too many recipients injected this hour" for an hourly based injection rate counter/limitation.

In the situation in which the catch-all HAT entry "ALL" is used, and it is that entry that is matched on the counter that exceeds the specified limit, additional handling can be performed if the system is configured to work with SenderBase. For example, if SenderBase has supplied a Flow Control Coefficient, the rate limit specified for the "ALL" entry in the HAT can be multiplied by the coefficient prior to comparison to the counter. Thus, the coefficient is a positive floating point number that is greater than zero and can typically is less than or equal to one. However, it is possible that the coefficient could be greater than one, depending on the output from SenderBase and approach used to determine the coefficient.

Typically, the counter used for controlling mail injection is the rate at which recipients are accepted by the recipient host domain. A recipient is considered to be "accepted" if the recipient is not rejected due to rate limiting of the mail flow.

As a result, if the recipient is rejected due to improper email address format or because the system is not supporting relaying, the counter is not incremented. However, in other implementations, the counter is incremented regardless of the reason for the recipient being rejected.

J. Controlling the Number of Connections Made to a Recipient Domain

Techniques are described for controlling the number of connections to a recipient domain or recipient host. For example, the system establishes a counter for the number of connections to a recipient host, such as an MTA, and when the number of connections exceeds a specified number, no further connections are allowed until the number of current connections drops below the specified number. As a specific example, a mail server may have a limit of 50 connections at any given time, so that when the 51st connection is attempted, the mail server refuses to establish the connection with the sending host.

In some implementations, the number of allowed connections is counted based on one or more sender identifiers. For example, the number of connections from an IP address can be limited to a specified number, and the number of connections from another IP address can be limited to another specified number. In general, any type of sender identifier can be used, including but not limited to, one or more of the following: a network address, an IP address, a range of IP addresses, a list of IP addresses, a domain, a fully qualified domain name, a SenderBase organization ID, and a reputation score, such as a SenderBase reputation score.

In one embodiment, the maximum number of connections is specified by a parameter in the HAT. For example, a variable called "max_concurrency" is used to specify the number of connections for the associated sender identifier. In general, any type or combination of sender identifiers can be used on the left side of the HAT so that the system aggregates connections from all of the corresponding sender IP addresses and compares the aggregate number of connections to the specified maximum number of connections, and when the limit is exceeded, each connection is treated with the REJECT action.

In addition, in some implementations, one or more sender identifiers can be excluded from the counter that is compared to the maximum number of allowable connections. For example, the user can add an entry to the RAT to specify one or more IP addresses or other sender identifiers that are not to be counted against the maximum number of connections for the sender identifier that is specified in the HAT.

K. Limiting Directory Harvest Attacks

Techniques are described that allow the system to track the number of invalid recipient addresses, and when a specified number of invalid recipient addresses have been received, the system no longer sends a bounce message to the sender. For example, a spammer can use a directory harvest attack to generate a list of valid email addresses for a host domain. Because the recipient host typically generates a bounce message when a message is addressed to an invalid email address, the spammer can determine valid email addresses based on the lack of a bounce message, thereby constructing a directory of valid email addresses at the recipient host. While directory harvest attacks can be prevented by never sending bounce messages, there will be messages that include invalid addresses, due to typographical errors in entering the address for example, for which a bounce message should be desired.

The approach described herein allows a limited number of bounce messages, but at a certain point, bounce messages are no longer returned to the sender of the emails having invalid email addresses, based on the assumption that when the specified limit is reached, the likely cause of so many invalid recipient addresses is that a directory harvest attack is occurring.

For example, the HAT can include a rule that associates a sender identifier with a variable, such as max_invalid_rcpts_per_hour, that specifies the maximum allowed number of invalid email recipient addresses in a given time period, such as one hour. A counter is used to track the number of invalid email addresses from the sender. So long as the counter does not exceed the specified limit, invalid addresses are treated in the typical fashion, with an SMTP response being sent back to inform the sender that the email address is invalid (e.g., a bounce message). However, when the counter exceeds the specified maximum number of invalid email addresses during the time period, bounce messages are no longer sent to the sender and the messages are dropped. At the end of the time period, the counter is reset to zero and begins tracking the number of invalid recipients from the sender once again.

As a result, when a directory harvest attack occurs, some of the initial messages sent by the sender are treated in the normal fashion with bounce messages generated and sent for any invalid addresses. The spammer can determine based on the initial messages some valid and invalid email addresses. However, after the limit is reached and the invalid recipient address messages begin to simply be dropped, the spammer no longer receives any bounce messages, and thus the spammer is incorrectly led to believe that all the messages are addressed to valid email addresses, when in fact many or perhaps even most are not. When the spammer uses the subsequently created list of allegedly valid email addresses, most will then bounce at a later time during a spam mailing campaign, or will be treated again as a subsequent directory harvest attack.

The specified limit on the number of invalid recipient addresses can be set by the user, such as the administrator for the MTA, and the MTA can be configured with a default value and whether to have directory harvest attack prevention enabled or not. A limit of zero can be used to disable the limit. As an example, a typical recommended value for the maximum number of invalid recipients can be 10 invalid recipients per hour per sender identifier (e.g., HAT entry).

Sender identifiers for directory harvest prevention work in the same manner as for mail flow injection control and limiting the number of connections. Thus, the sender is keyed off of the string value in the HAT host entry that matches the incoming connection, or the constructed string value if the use SenderBase (e.g., "use_sb") option is active.

In some implementations, the analysis of whether recipient addresses is performed outside of the SMTP conversation. Thus, whether the recipient address is invalid is determined after the SMTP conversation. Any bounce messages generated for invalid recipient addresses must be sorted by the spammer to determine why the attempted delivery failed, which servers to further deter the directory harvest attack.

For purposes of designating the start of a directory harvest attack, some implementations may use the time at which the first invalid recipient email address that exceeds the specified limit occurs. The detection of a directory harvest attack can be logged and reported to SenderBase, if desired. The identification of a directory harvest attack can include additional information, such as the IP address of the sender from which the invalidly addressed messages originate, the reversed DNS results for the sender's IP address, the HAT entry that matched the sender, and the threshold limit for the number of invalid recipients.

Optionally, an alert message can be sent to the user or administrator of the recipient host, and the mail flow monitoring system can track the number of recipients being rejected after the start of a directory harvest attack. For the alert sent to the user, one or more of the following items of information can be included: notification of a potential directory harvest attack, the fact that a message has been dropped (instead of bounced), the IP address of the sender of the dropped message, the reversed DNS results of the sender's IP address, the HAT entry that matched the sender, the threshold/limit set for the number of invalid recipients per period of time, the Envelope Sender from the message envelope, the Envelope Recipient(s) from the message envelope, and the Message Headers.

The following is a CLI example for establishing the parameters for directory harvest attack prevention.

```
Enter the maximum number of recipients per message. Type DEFAULT
    to inherit the value from the default settings.
    [1000]>
    Would you like to specify a custom SMTP response? [N]>
    Do you want to enable rate limiting per host? (Yes/No/Default) [Y]>
    Yes
    Enter the maximum number of recipients per hour from a remote
    host. [100]> 1000
    Would you like to specify a custom SMTP limit exceeded response?
    [Y]>
    Enter the SMTP code to use in the response. 452 is the standard code.
    [452]>
    Enter your custom SMTP response. Press Enter on a blank line to
    finish. Too many recipients received this hour
    Would you like to enable Directory Harvest Attack Prevention
    per host (Yes/No/Default) [ ]> Y
    Enter the maximum number of invalid recipients per hour from a
    remote host.
    [10]>
```

In addition, an optional web interface can be used by the user to configure directory harvest attack prevention, along with other features as described herein.

L. Command Line Interface Examples

The following is an example of using the CLI to allow a user to setup a SenderBase caching strategy.

```
gator.ironport.com> injectorconfig
Currently configured injectors:
1. main_qmqp (on main, 10.1.1.71) QMQP Port 8628 Private
2. main_smtp (on main, 10.1.1.71) SMTP Port 8025 Private
Enter "NEW" to create a new injector, "EDIT" to modify, "DELETE" to
remove,
or "SETUP" to change global settings.
[ ]> setup
Enter the global max injector concurrency.
[600]>
Choose a SenderBase data cache option:
1. Allow SenderBase to determine cache time. (recommended)
2. Don't cache SenderBase data.
3. Specify your own cache time.
[1]> 3
Enter the time, in seconds, to cache SenderBase data:
[300]> 3600
Currently configured injectors:
1. main_qmqp (on main, 10.1.1.71) QMQP Port 8628 Private
2. main_smtp (on main, 10.1.1.71) SMTP Port 8025 Private
Enter "NEW" to create a new injector, "EDIT" to modify, "DELETE" to
```

-continued

```
remove,
or "SETUP" to change global settings.
[ ]>
```

The following CLI example illustrates additional setup options for the user to specify for controlling the flow of messages.

```
Name: main_smtp
Type: Private
Interface: main (10.1.1.71/24) Port 8025
Protocol: SMTP
Default Domain:
Max Concurrency: 600 (TCP Queue: 1000)
Max Message Size: 100M
Bounce Profile: Default
IPMM: off
Enter one of the following commands to change this injector's settings:
NAME, INTERFACE, LIMITS, HOSTACCESS,
SETUP, BOUNCECONFIG, MASQUERADE, SETTLS, SETIPMM
[ ]> setup
Enter the default domain for email addresses without a fully qualified
domain name.
Enter the word "DELETE" to clear the setting and disable the addition
of a
default domain.
[ ]>
Would you like the system to add a received header to each message
received
on this injector? [Y]>
Would you like to enable SenderBase IP verification support? [N]> y
Enter a timeout, in seconds, for SenderBase queries. Enter '0' to
disable
SenderBase IP verification.
[5]> 3
Name: main_smtp
Type: Private
Interface: main (10.1.1.71/24) Port 8025
Protocol: SMTP
Default Domain:
Max Concurrency: 600 (TCP Queue: 1000)
Max Message Size: 100M
Bounce Profile: Default
IPMM: off
Enter one of the following commands to change this injector's settings:
NAME, INTERFACE, LIMITS, HOSTACCESS,
SETUP, BOUNCECONFIG, MASQUERADE, SETTLS, SETIPMM
[ ]>
```

V. HARDWARE OVERVIEW

A. General Hardware Overview

The approaches for managing connections and messages at a server by associating different actions for both different senders and different recipients described herein may be implemented in a variety of ways and the invention is not limited to any particular implementation. The approach may be integrated into an electronic mail system or a mail transport agent, or may be implemented as a stand-alone mechanism. Furthermore, the approach may be implemented in computer software, hardware, or a combination thereof.

FIG. 6 is a block diagram that depicts a computer system 600 upon which an embodiment may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for implementing the techniques described herein. According to one embodiment, those techniques are performed by computer system 600 in response to processor 604 executing one or more sequences of one or more instructions contained in main memory 606. Such instructions may be read into main memory 606 from another machine-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution. In this manner, computer system 600 may obtain application code in the form of a carrier wave.

B. Hardware Examples

The techniques disclosed herein can be implemented on devices that are used as a mail server between one network and another, such as between the network of a company and the Internet. Such devices may be referred to as mail gateway appliances (MGA's) or more generally as mail transfer agents (MTA's) because they act as a gateway between the networks and act as a mail server for sending and receiving email messages. As examples, the IronPort A-Series Appliances and C-Series Appliances produced by IronPort Systems, Inc., of San Bruno, Calif., can be used to implement one or more of the techniques described herein. These appliances are described in more detail below. However, the techniques described herein can be used with any suitable mechanism, not just IronPort's MTA's or any other manufacturer's MTA's.

The IronPort A-Series family includes two mail transport agents, the A30 and A60, which provide high performance email delivery to a large number of recipients, such as for commercial email delivery of transaction confirmations or customer newsletters. The A30 can deliver 600,000 email messages per hour, and the A60 can deliver 1,000,000 messages per hour, both of which are much greater than can be achieved by traditional open-source mail transport agents (MTAs), such as general-purpose servers running sendmail or qmail. Mail transport agents such as the IronPort A-Series family of Messaging Gateway Appliances™ are sometimes referred to as "injectors" because such mail transport agents inject messages into another mail transport agents, such as by sending email through the Internet from a sender that is associated with one mail transport agent to a recipient that is associated with another mail transport agent.

The IronPort C-Series family includes three email security appliances, the C10, C30 and C60, which provide threat protection, block spam and viruses, and enable corporate email policy enforcement. The email security appliances in the C-Series family are deployed between an organization's firewall and groupware servers, such as Exchange™, Notes™, and GroupWise™, to power and protect email flowing in from or out to the Internet.

The different A-Series and C-Series appliances include some or all of the following IronPort technologies: Stackless Threads™, I/O-Driven Scheduling™, AsyncFS™, Reputation Filters™, and SenderBase™.

The IronPort Stackless Threads™ technology allows a C-series email security appliance to handle up to 10,000 simultaneous connections. With Stackless Threads, each thread is allocated memory as needed, in contrast to traditional approaches in which each thread is allocated a fixed and dedicated memory stack that is typically very generous to avoid stack overflow errors. The allocation of memory on an as needed basis with Stackless Threads more efficiently uses memory and increases concurrency while eliminating the risk of security holes and system crashes from stack overflows.

The IronPort I/O-Driven Scheduling™ technology optimally schedules service for each connection. As with Stackless Threads, IronPort's I/O Driven Scheduling allocates system resources as needed. Tasks are scheduled around the availability of transmission control protocol (TCP) connections for reading or writing, so that when a TCP connection becomes available, I/O-Driven Scheduling grants system resources to the associated task until such time as the connection is no longer capable of I/O. This approach avoids the needless rotation through multiple tasks that is characteristic of traditional preemptive multitasking operating systems in which a scheduler cycles through each task to ensure that no task is starved and to allocate a predetermined time slice of the CPU. Such traditional approaches are inefficient for Internet message delivery that is typically not bound by CPU processing, and thus the traditional approaches incur a substantial performance decrease due to excessive context switching. In addition, with I/O-Driven Scheduling, the thread switches happen at the completion of an I/O read or write, so that threads are not left hanging in the middle of an operation and the memory management in each thread is simplified.

The IronPort AsyncFS™ technology provides an asynchronous file system, which is optimized for message queuing. In traditional messaging systems, each message is allocated a separate and unique file that must be written, read, and deleted. Managing these files in traditional approaches becomes prohibitive when receiving hundreds of thousands of messages per hour, and in addition, modifying any file involves multiple disk accesses to update data within a file and multiple disk accesses to update inodes (e.g., maps of pointers to each bloc of data within a file that are stored on disk). With AsyncFS, messages are stored in batches, not individual files, which reduces the number of basic read/write operations. Furthermore, each queue data structure, which governs the order of message delivery, doubles as an inode that maps where messages are stored on disk. These "inode queues" are stored in RAM instead of on disk, further reducing the read/write operations. In the event of a system disruption or failure that removes the inode queues from RAM, AsyncFS reads message data from disk as it rebuilds the inode queues in RAM and resume message delivery.

IronPort's Reputation Filters™ are used to intelligently throttle, or even block, suspicious senders. The appliance receives inbound mail and performs a threat assessment of the sender, resulting in a reputation score generated by SenderBase, as described below. The appliance then applies mail flow policies that are specified by an administrator to the inbound mail based on the reputation score. More suspicious senders are automatically throttled or blocked, and recognized senders (e.g., customers or corporate partners) are granted more generous policies, such as bypassing spam filters, larger message sizes, and TLS encryption. Reputation Filters™ allow for a flexible response, thereby minimizing the effects of denial of service attacks, directory harvest attacks, and fraudulent mail, along with reducing false positives.

IronPort's Reputation Filters™ work with SenderBase™, a sender reputation service created by IronPort, and Bonded Sender™, an email certification program created by IronPort. SenderBase provides objective data about the identity of email senders to allow email administrators to identify and block IP addresses from which unsolicited commercial email originates or to verify the authenticity of legitimate incoming email from business partners, customers, or other important sources. SenderBase includes an open database that has been adopted by more than 13,000 ISPs, corporations, and universities. SenderBase processes queries for more than 500 million messages per day to provide a real-time view into the global volume of mail being sent by any given IP address. SenderBase measures other parameters, such as whether an IP address is an open proxy, if mail receivers are sending spam complaints about the IP address, if its DNS resolves properly and accepts return mail, its country of origin, and its presence on a variety of blacklists. The parameters are used as input to a statistical algorithm that scores the reputation of the sender on a scale of −10 to +10.

The different A-Series and C-Series appliances include one or both of the following nonIronPort technologies: the Sophos™ anti-virus technology and the Brightmail™ anti-spam technology. The C-Series appliances and optionally the A60 appliance include the Sophos™ anti-virus technology. Sophos employs multiple techniques to detect and clean all major forms of viruses, including advanced emulation technology to detect polymorphic viruses and an on-line decompressor for scanning multi-layer attachments. Administrators can take any of several actions to handle messages that are identified as being infection by Sophos. For example, actions include cleaning the message, dropping the attachment, modifying the subject header, deleting the entire infected message, sending an optional notification, or a combination of these actions. The Sophos engine shares information with the IronPort C-Series Mail Flow Monitor to provide real-time and historical reports. During a virus outbreak, the period from the start of the outbreak until an anti-virus identify file is deployed can be covered by IronPort's content scanning technology to identify viruses based on known patterns, or messages can be deleted or archived until new identity files are updated.

The C-Series IronPort appliances include the Brightmail™ anti-spam technology, which is optimized to work with IronPort's AsyncOS™. Brightmail uses real-time methods to identify spam through Brightmail's Probe Network™ and generates approximately 30,000 new rules a day. Automatic rule updates are used, with rules automatically downloaded from the Brightmail servers typically every ten minutes to provide real-time protection. Administrators can take any of several actions to handle messages that are flagged as spam by Brightmail. The actions include sending the messages to a per-recipient web quarantine, marking up the subject header, adding an additional "X-header," sending the message to an alternate folder in the user's mailbox, deleting or bouncing the message, or a combination of these actions. The Brightmail system shares information with the IronPort C-Series Mail Flow Monitor to provide real-time and historical reports that are available at any time.

VI. EXTENSIONS AND ALTERNATIVES

In the foregoing description, the invention has been described with reference to specific embodiments thereof. It will, however, be evident that various modifications and changes may be made thereto without departing from the broader spirit and scope of the invention. For example, although examples have illustrated the use of network addresses and IP addresses as a particular type of network address, these types of sender identifiers are used for explanation purposes only and embodiments of the invention are not limited to any particular type of network address or more generally any type of sender identifier. As another example, while the examples are described with reference to email or email messages, the approaches described herein can be applied to any type of electronic message, not just email messages. Thus, the specification and drawings are, accordingly, to be regarded in an illustrative rather than a restrictive sense. The invention includes other contexts and applications in which the mechanisms and processes described herein are available to other mechanisms, methods, programs, and processes.

Certain process steps are set forth herein in a particular order, and alphabetic and alphanumeric labels are used to identify steps. Unless specifically stated herein, the approaches herein are not limited to any particular order of carrying out such steps. The labels are used merely for convenient identification of steps, and are not intended to imply, specify or require a particular order of carrying out such steps. Other implementations may use more or fewer steps than those discussed herein.

What is claimed is:

1. A method for managing electronic messages received at a server, comprising:
    reading a stored configuration file that includes a first mapping associating a plurality of sender identifiers with a first plurality of actions;
    wherein each sender identifier of said plurality of sender identifiers is selected from a group of possible sender identifier types supported by said server, said group comprising at least a network address, a partial network address, a range of network addresses, a fully qualified domain name (FQDN), a partial FQDN, a subnet, and a reputation score;
    receiving at said server a first incoming connection from a first sender;
    based on said first incoming connection and before an e-mail message is received over said first incoming connection, determining a first sender identifier of said plurality of sender identifiers;
    using said first mapping and a first sender identifier, determining a first action associated with the first sender identifier;
    wherein said first mapping associates said first sender identifier with said first action, wherein said first action indicates that the first incoming connection associated with said first sender identifier should not be accepted;
    in response to determining that said first action indicates that the first incoming connection associated with said first sender identifier should not be accepted, despite said first action, performing the following:
        receiving at said server, via the first incoming connection, a first electronic message for a first recipient;
        based on said first electronic message, determining a first recipient identifier of a plurality of recipient identifiers,
        based on said first recipient identifier, inspecting a second mapping to identify a second action of a second plurality of actions, wherein said second mapping associates said plurality of recipient identifiers with said second plurality of actions,
        based on said second action, delivering said first electronic message to said first recipient even though said first electronic message would otherwise not be delivered because said first action indicated that the first incoming connection, over which the first electronic message was received, should not have been accepted;
    wherein the method is performed by one or more processors.

2. A method as recited in claim 1, wherein said first recipient identifier is selected from the group consisting of a first set of two or more full electronic message addresses, a partial electronic message address, a fully qualified domain name (FQDN), a partial FQDN, a second set of two or more usernames, and a partial username.

3. A method as recited in claim 1, wherein:
    said second mapping is an ordered listing of two or more rules, wherein:
        each rule of said two or more rules associates a particular recipient identifier of the plurality of recipient identifiers with a particular action of the plurality of actions; and
        said first recipient identifier is included in at least a first rule and a second rule of said two or more rules, wherein said first rule is listed before said second rule in said ordered listing of two or more rules;
    inspecting said second mapping to identify said first action comprises:
        based on said first recipient identifier, searching said ordered listing to identify said first rule based on said first rule being listed before said second rule; and
        identifying said first action as said particular action associated with said first recipient identifier in said first rule.

4. A method as recited in claim 1, wherein:
    said first action is associated with a parameter that is selected from the group consisting of a response code, a response text, and a banner text; and
    the method further comprises:
        based on said parameter, sending a response.

5. A method as recited in claim 1, wherein said second action is an accept action.

6. A machine-readable storage medium storing one or more sequences of instructions for managing electronic messages received at a server, wherein execution of the one or more sequences of instructions by one or more processors causes the one or more processors to perform the steps of:
  reading a stored configuration file that includes a first mapping associating a plurality of sender identifiers with a first plurality of actions;
  wherein each sender identifier of said plurality of sender identifiers is selected from a group of possible sender identifier types supported by said server, said group comprising at least a network address, a partial network address, a range of network addresses, a fully qualified domain name (FQDN), a partial FQDN, a subnet, and a reputation score;
  receiving at said server a first incoming connection from a first sender;
  based on said first incoming connection and before an e-mail message is received over said first incoming connection, determining a first sender identifier of said first plurality of sender identifiers;
  using said first mapping and a first sender identifier, determining a first action associated with the first sender identifier;
  wherein said first mapping associates said first sender identifier with said first action, wherein said first action indicates that the first incoming connection associated with said first sender identifier should not be accepted;
  in response to determining that said first action indicates that the first incoming connection associated with said first sender identifier should not be accepted, despite said first action, performing the following:
    receiving at said server, via the first incoming connection, a first electronic message for a first recipient;
    based on said first electronic message, determining a first recipient identifier of a plurality of recipient identifiers;
    based on said first recipient identifier, inspecting a second mapping to identify a second action of a second plurality of actions, wherein said second mapping associates said plurality of recipient identifiers with said second plurality of actions;
    based on said second action, delivering said first electronic message to said first recipient even though said first electronic message would otherwise not be delivered because said first action indicated that the first incoming connection, over which the first electronic message was received, should not have been accepted.

7. A machine-readable storage medium as recited in claim 6, wherein said first recipient identifier is selected from the group consisting of a first set of two or more full electronic message addresses, a partial electronic message address, a fully qualified domain name (FQDN), a partial FQDN, a second set of two or more usernames, and a partial username.

8. A machine-readable storage medium as recited in claim 6, wherein:
  said second mapping is an ordered listing of two or more rules, wherein:
    each rule of said two or more rules associates a particular recipient identifier of the plurality of recipient identifiers with a particular action of the plurality of actions; and
    said first recipient identifier is included in at least a first rule and a second rule of said two or more rules, wherein said first rule is listed before said second rule in said ordered listing of two or more rules;
  wherein the instructions for inspecting said second mapping to identify said first action further comprise instructions which, when executed by the one or more processors, cause the one or more processors to perform the steps of:
    based on said first recipient identifier, searching said ordered listing to identify said first rule based on said first rule being listed before said second rule; and
    identifying said first action as said particular action associated with said first recipient identifier in said first rule.

9. A machine-readable storage medium as recited in claim 6, wherein:
  said first action is associated with a parameter that is selected from the group consisting of a response code, a response text, and a banner text; and
  the machine-readable medium further comprises instructions which, when executed by the one or more processors, cause the one or more processors to perform the step of:
    based on said parameter, sending a response.

10. A machine-readable storage medium as recited in claim 6, wherein said first action is an accept action.

11. An apparatus comprising:
  a processor; and
  a memory coupled to the processor, the memory containing one or more sequences of instructions for managing electronic messages received at a server, wherein execution of the one or more sequences of instructions by the processor causes the processor to perform the steps of:
    reading a stored configuration file that includes a first mapping associating a plurality of sender identifiers with a first plurality of actions;
    wherein each sender identifier of said plurality of sender identifiers is selected from a group of possible sender identifier types supported by said server, said group comprising at least a network address, a partial network address, a range of network addresses, a fully qualified domain name (FQDN), a partial FQDN, a subnet, and a reputation score;
    receiving at said server a first incoming connection from a first sender;
    based on said first incoming connection and before an e-mail message is received over said first incoming connection, determining a first sender identifier of said plurality of sender identifiers;
    using said first mapping and a first sender identifier, determining a first action associated with the first sender identifier;
    wherein said first mapping associates said first sender identifier with said first action, wherein said first action indicates that the first incoming connection associated with said first sender identifier should not be accepted;
    in response to determining that said first action indicates that the first incoming connection associated with said first sender identifier should not be accepted, despite said first action, performing the following:
      receiving at said server, via the first incoming connection, a first electronic message for a first recipient;
      based on said first electronic message, determining a first recipient identifier of a plurality of recipient identifiers;
      based on said first recipient identifier, inspecting a second mapping to identify a second action of a second plurality of actions, wherein said second mapping associates said plurality of recipient identifiers with said second plurality of actions;

based on said second action, delivering said first electronic message to said first recipient even though said first electronic message would otherwise not be delivered because said first action indicated that the first incoming connection, over which the first electronic message was received, should not have been accepted.

12. An apparatus as recited in claim 11, wherein said first recipient identifier is selected from the group consisting of a first set of two or more full electronic message addresses, a partial electronic message address, a fully qualified domain name (FQDN), a partial FQDN, a second set of two or more usernames, and a partial username.

13. An apparatus as recited in claim 11, wherein:

said second mapping is an ordered listing of two or more rules, wherein:

each rule of said two or more rules associates a particular recipient identifier of the plurality of recipient identifiers with a particular action of the plurality of actions; and said first recipient identifier is included in at least a first rule and a second rule of said two or more rules, wherein said first rule is listed before said second rule in said ordered listing of two or more rules;

wherein the instructions for inspecting said second mapping to identify said first action further comprise instructions which, when executed by the processor, cause the processor to perform the steps of:

based on said first recipient identifier, searching said ordered listing to identify said first rule based on said first rule being listed before said second rule; and identifying said first action as said particular action associated with said first recipient identifier in said first rule.

14. An apparatus as recited in claim 11, wherein:

said first action is associated with a parameter that is selected from the group consisting of a response code, a response text, and a banner text; and the memory further contains one or more sequences of instructions which, when executed by the processor, cause the processor to perform the step of:

based on said parameter, sending a response.

15. An apparatus as recited in claim 11, wherein said first action is an accept action.

\* \* \* \* \*